US008512152B2

(12) United States Patent
Ehara et al.

(10) Patent No.: US 8,512,152 B2
(45) Date of Patent: Aug. 20, 2013

(54) HAND-HELD GAME APPARATUS AND HOUSING PART OF THE SAME

(75) Inventors: Yui Ehara, Kyoto (JP); Junichiro Miyatake, Kyoto (JP); Hiroki Goto, Kyoto (JP); Kochi Kawai, Kyoto (JP); Satoshi Ishibashi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 362 days.

(21) Appl. No.: 13/030,499

(22) Filed: Feb. 18, 2011

(65) Prior Publication Data
US 2011/0306412 A1 Dec. 15, 2011

(30) Foreign Application Priority Data

Jun. 11, 2010 (JP) .................................. 2010-134450

(51) Int. Cl.
*A63F 13/00* (2006.01)
(52) U.S. Cl.
USPC .................... 463/46; 463/36; 463/37; 463/38
(58) Field of Classification Search
USPC .......................................... 463/36, 37, 38, 46
See application file for complete search history.

(56) References Cited

U.S. PATENT DOCUMENTS

| 6,020,891 | A | 2/2000 | Rekimoto |
| 6,057,833 | A | 5/2000 | Heidmann et al. |
| 6,252,624 | B1 | 6/2001 | Yuasa et al. |
| 6,325,287 | B1 | 12/2001 | Nakajima et al. |
| 6,342,900 | B1 | 1/2002 | Ejima et al. |
| 6,474,819 | B2 | 11/2002 | Yoder et al. |
| 6,708,046 | B1 | 3/2004 | Takagi |
| 6,820,056 | B1 | 11/2004 | Harif |
| 6,897,865 | B2 | 5/2005 | Higashiyama |
| 7,374,490 | B2 * | 5/2008 | Tahara et al. ................... 463/43 |
| 7,519,218 | B2 | 4/2009 | Takemoto et al. |
| 8,115,814 | B2 | 2/2012 | Iwase et al. |
| 8,189,038 | B2 | 5/2012 | DeCusatis et al. |
| 8,202,094 | B2 | 6/2012 | Spector |
| 8,305,428 | B2 * | 11/2012 | Hu .................................. 348/46 |
| 2001/0019946 | A1 | 9/2001 | Okuda |
| 2005/0239521 | A1 | 10/2005 | Harada et al. |
| 2005/0270368 | A1 | 12/2005 | Hashimoto |
| 2006/0038833 | A1 | 2/2006 | Mallinson et al. |
| 2006/0060463 | A1 | 3/2006 | Tokusashi |

(Continued)

FOREIGN PATENT DOCUMENTS

| EP | 1 720 131 | 11/2006 |
| EP | 2 157 545 | 2/2010 |

(Continued)

OTHER PUBLICATIONS

Sep. 20, 2012 Office Action in U.S. Appl. No. 12/862,119, 31 pages.

(Continued)

*Primary Examiner* — James S McClellan
(74) *Attorney, Agent, or Firm* — Nixon & Vanderhye, P.C.

(57) ABSTRACT

A game apparatus has an upper housing and a lower housing which are foldable. A first part, a second part, and a third part constitute the upper housing. A fourth part, a fifth part, and a sixth part constitute the lower housing. By assembling the parts, the game apparatus comes to have a three-layered structure when folded, thereby enhancing operability, a degree of freedom of design, and the like.

8 Claims, 22 Drawing Sheets

(56) References Cited

U.S. PATENT DOCUMENTS

| | | |
|---|---|---|
| 2006/0171582 A1 | 8/2006 | Eichhorn |
| 2007/0001003 A1 | 1/2007 | Lee et al. |
| 2007/0273644 A1 | 11/2007 | Natucci |
| 2008/0100620 A1 | 5/2008 | Nagai et al. |
| 2008/0284842 A1* | 11/2008 | Hu .................................. 348/46 |
| 2009/0059497 A1 | 3/2009 | Kuwahara et al. |
| 2009/0060490 A1 | 3/2009 | Kuwahara et al. |
| 2009/0070476 A1 | 3/2009 | Brackx et al. |
| 2009/0224999 A1 | 9/2009 | Kuwahara et al. |
| 2009/0278764 A1 | 11/2009 | Kuwahara et al. |
| 2009/0278974 A1 | 11/2009 | Kuwahara et al. |
| 2009/0285484 A1 | 11/2009 | Mallinson et al. |
| 2010/0020222 A1 | 1/2010 | Jones et al. |
| 2010/0048290 A1 | 2/2010 | Baseley et al. |
| 2010/0257252 A1 | 10/2010 | Dougherty et al. |
| 2010/0316367 A1 | 12/2010 | Kuwahara et al. |
| 2011/0034103 A1 | 2/2011 | Fong et al. |

FOREIGN PATENT DOCUMENTS

| | | |
|---|---|---|
| JP | 06-339155 | 12/1994 |
| JP | 10-51711 | 2/1998 |
| JP | 2000-69404 | 3/2000 |
| JP | 2000-148904 | 5/2000 |
| JP | 2001-165144 | 6/2001 |
| JP | 2001-251396 | 9/2001 |
| JP | 2001-251398 | 9/2001 |
| JP | 2001-251399 | 9/2001 |
| JP | 2002-230586 | 8/2002 |
| JP | 2004-7214 | 1/2004 |
| JP | 2005-20559 | 1/2005 |
| JP | 2005-151162 | 6/2005 |
| JP | 2005-165776 | 6/2005 |
| JP | 2005-250950 | 9/2005 |
| JP | 2005-286714 | 10/2005 |
| JP | 2006-024175 | 1/2006 |
| JP | 2006-060516 | 3/2006 |
| JP | 2006-72667 | 3/2006 |
| JP | 2006-86099 | 3/2006 |
| JP | 2006-271663 | 10/2006 |
| JP | 2007-12025 | 1/2007 |
| JP | 2008-502206 | 1/2008 |
| JP | 2008-77437 | 4/2008 |
| JP | 2008-510254 | 4/2008 |
| JP | 2008-146109 | 6/2008 |
| JP | 2008-521110 | 6/2008 |
| JP | 4260215 | 2/2009 |
| JP | 2009-089435 | 4/2009 |
| JP | 2009-205556 | 9/2009 |
| JP | 2010-170316 | 8/2010 |
| JP | 2010-532120 | 9/2010 |
| JP | 2010-239568 | 10/2010 |
| JP | 2010-244575 | 10/2010 |
| WO | 03/105450 | 12/2003 |

OTHER PUBLICATIONS

Report on Nintendo DS Lite Hardware, Mar. 2, 2006, download from the internet, with a partial English translation, 13 pages.
Kato et al., "An Augmented Reality System and its Calibration based on Marker Tracking", Transactions of the Virtual Reality Society of Japan, vol. 4, No. 4, 1999, pp. 607-616.
Hirokazu Kato, Mark Billinghurst, "Marker Tracking and HMD Calibration for a Video-Based Augmented Reality Conferencing System," iwar, pp. 85, 2nd IEEE and ACM International Workshop on Augmented Reality, 1999, 10 pages.
Report on Nintendo DS Lite Hardwire, Mar. 2, 2006, 5 pages, http://pc.watch.impress.co.jp/docs/2006/0302/nintendo.htm.
U.S. Appl. No. 12/862,119, filed Aug. 24, 2010, Shinji Kitahara et al.
U.S. Appl. No. 13/030,499, filed Feb. 18, 2011, Yui Ehara et al.
U.S. Appl. No. 13/158,824, filed Jun. 13, 2011, Yuichiro Ito.
U.S. Appl. No. 13/158,939, filed Jun. 13, 2011, Yuichiro Ito.
U.S. Appl. No. 13/158,736, filed Jun. 13, 2011, Yuichiro Ito.
U.S. Appl. No. 13/006,039, filed Jan. 13, 2011, Hideki Konno et al.
U.S. Appl. No. 13/243,622, filed Sep. 23, 2011, Yuichiro Ito et al.
Yokoya et al., "Stereo Vision Based Video See-through Mixed Reality" Mixed Reality, Merging Real and Virtual Worlds, Proceedings of International Symposium on Mix Reality, Merging Real and Virtual Worlds, Jan. 1, 1999, pp. 131-145, 15 pages.
Nov. 9, 2012 Office Action in U.S. Appl. No. 12/946,248, 40 pages.
Jun. 11, 2012, Notice of Allowance for U.S. Appl. No. 13/006,039, 16 pages.

\* cited by examiner

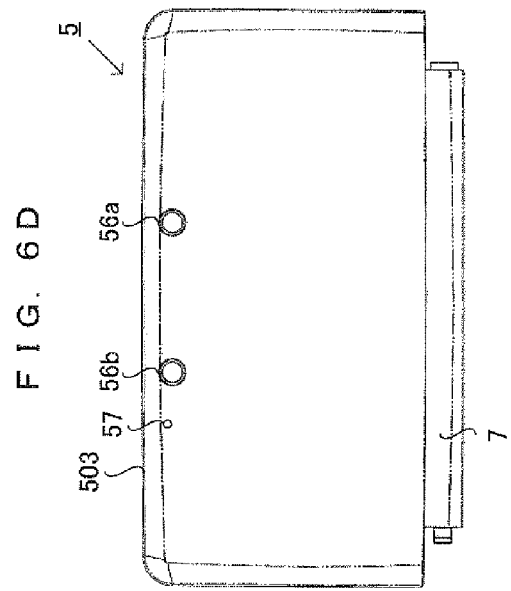
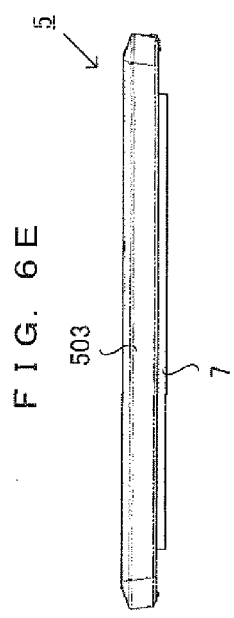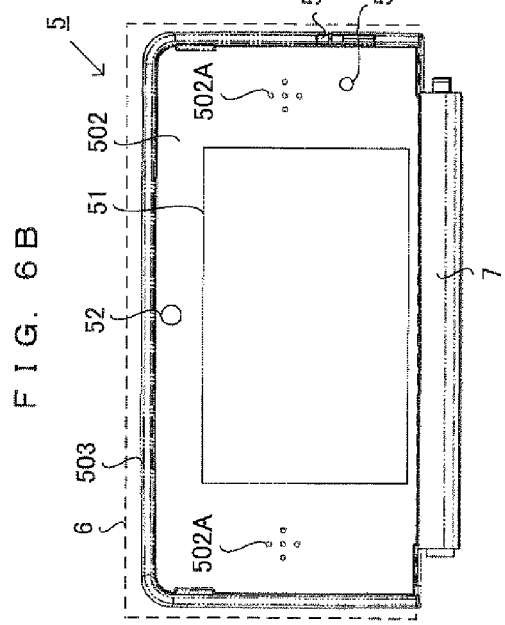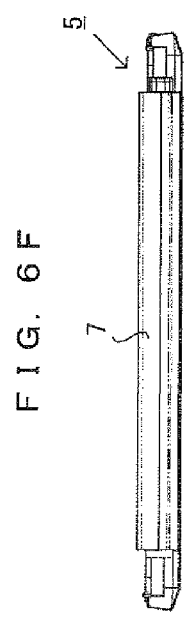
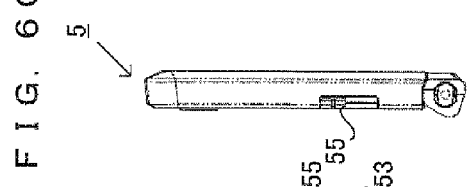
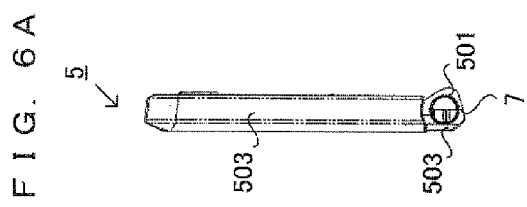

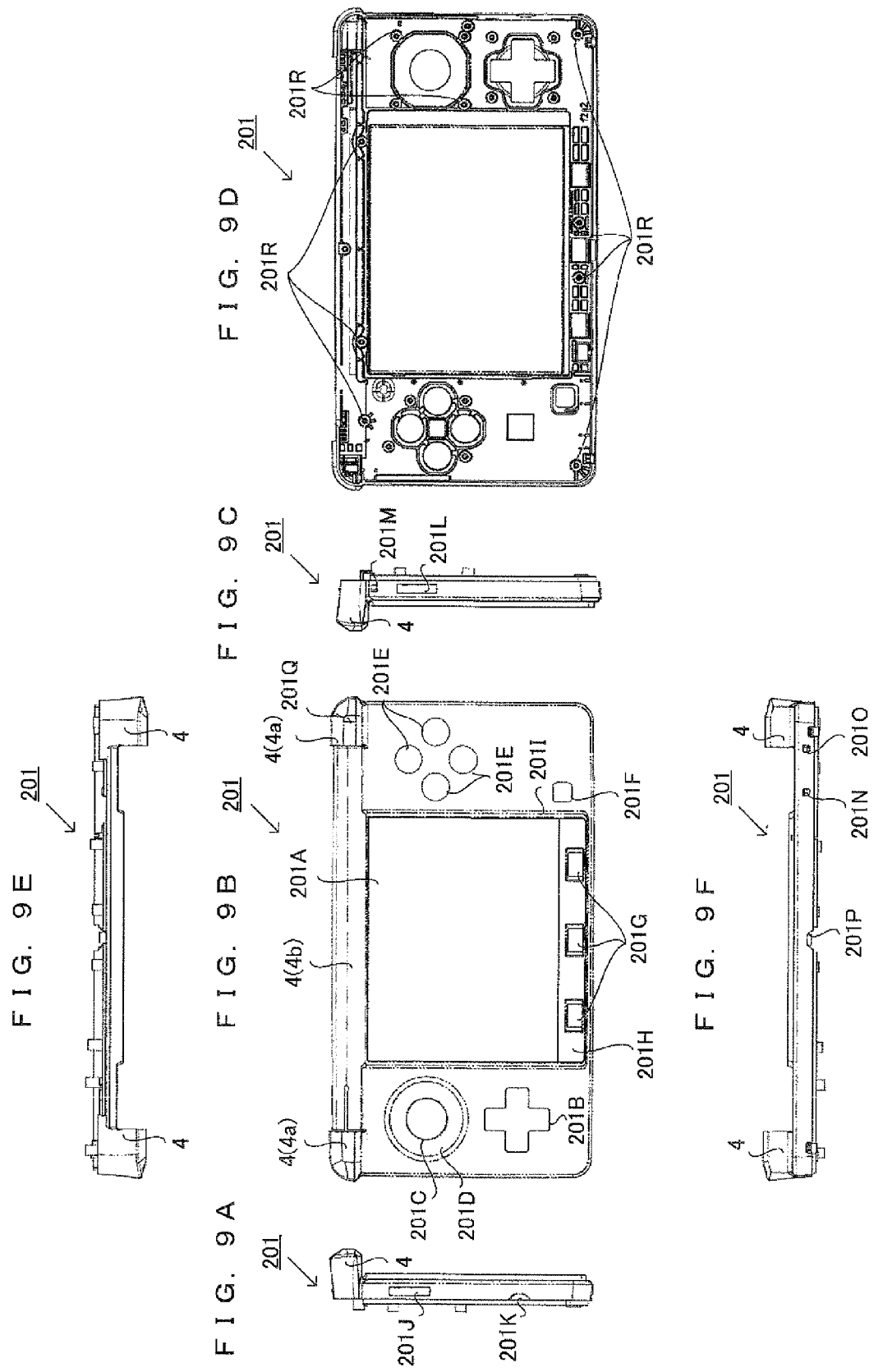

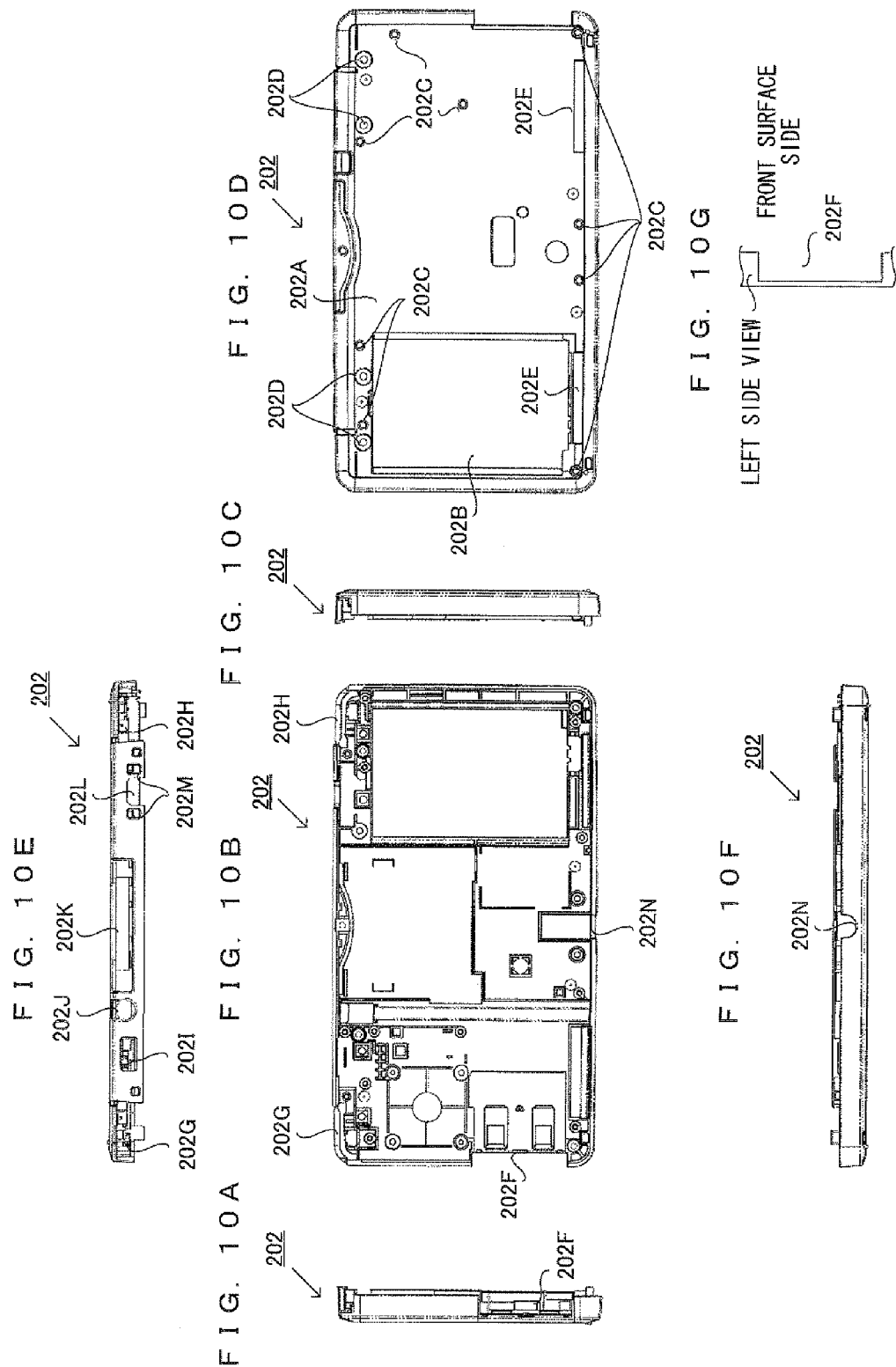

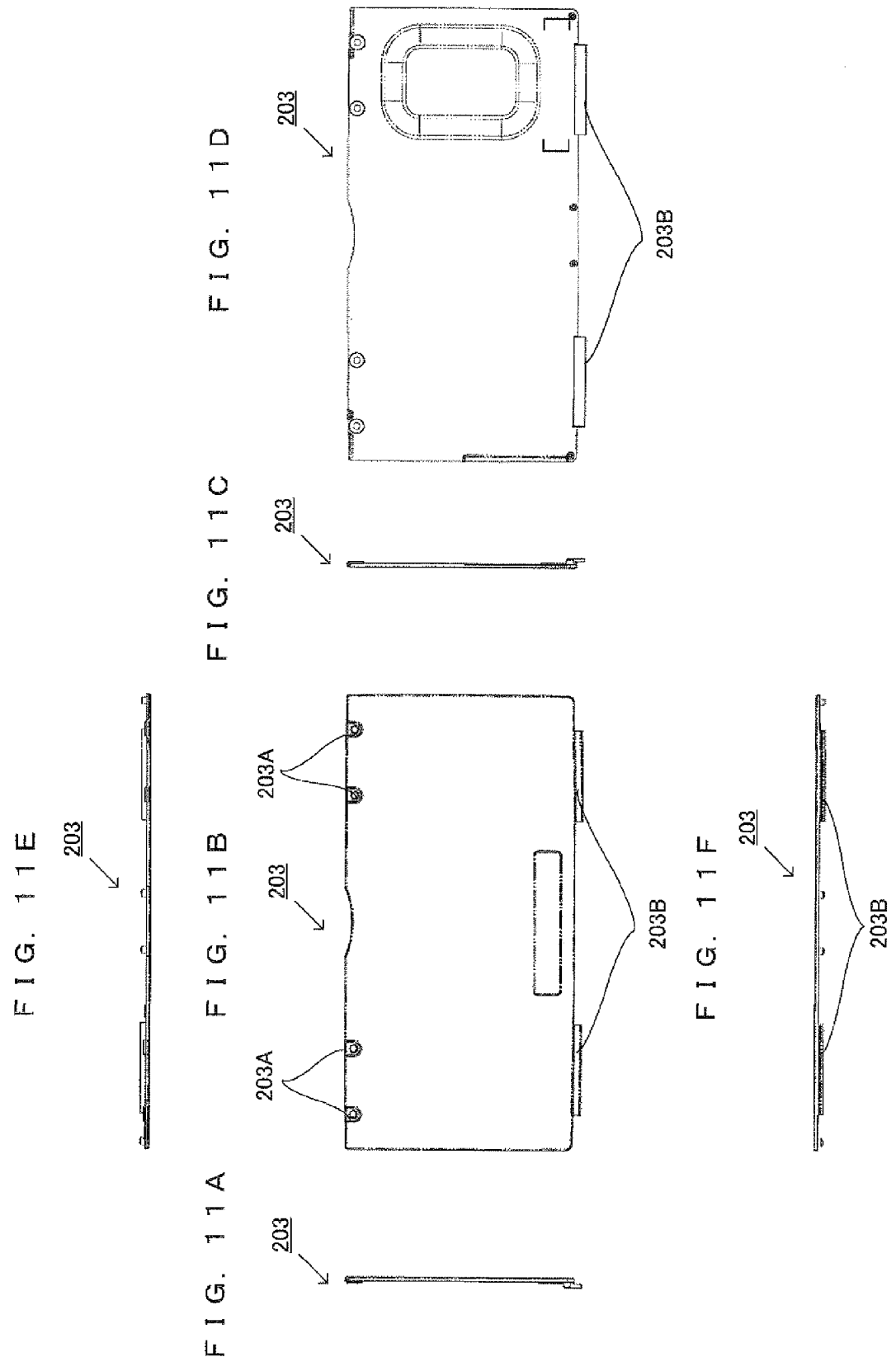

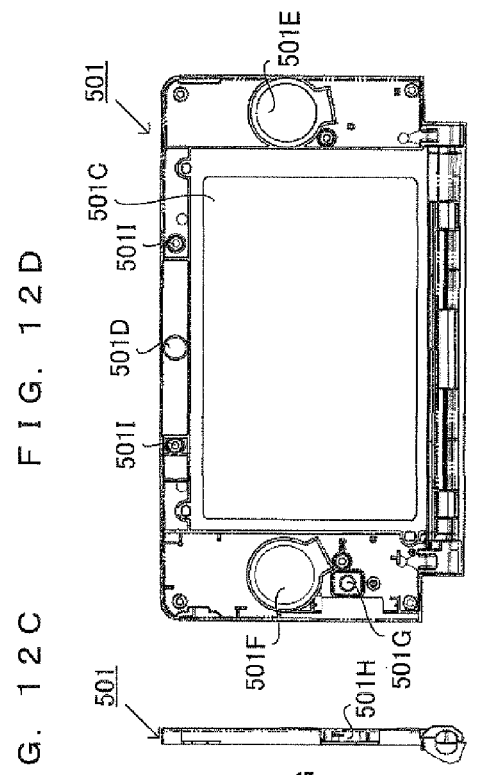

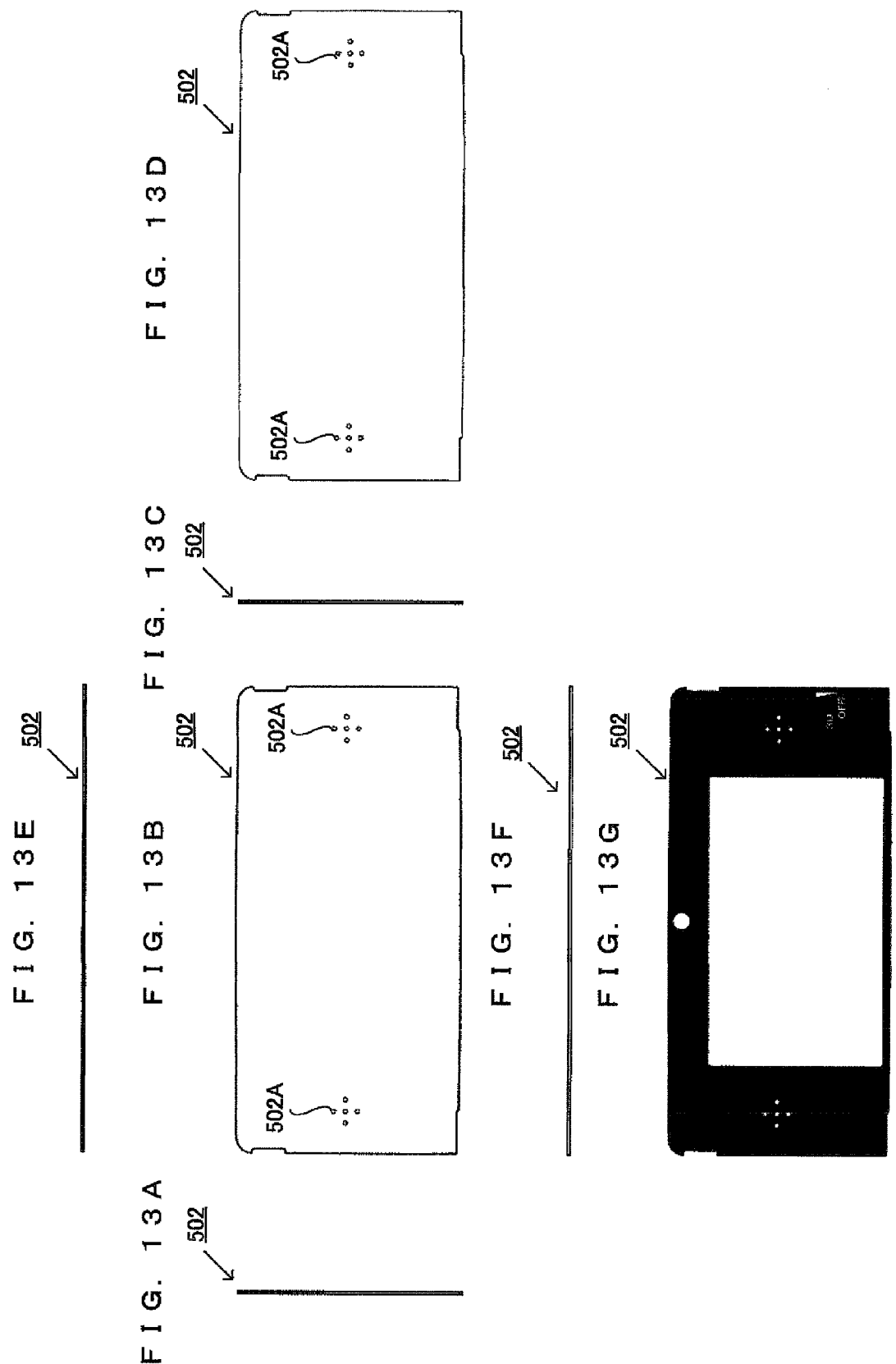

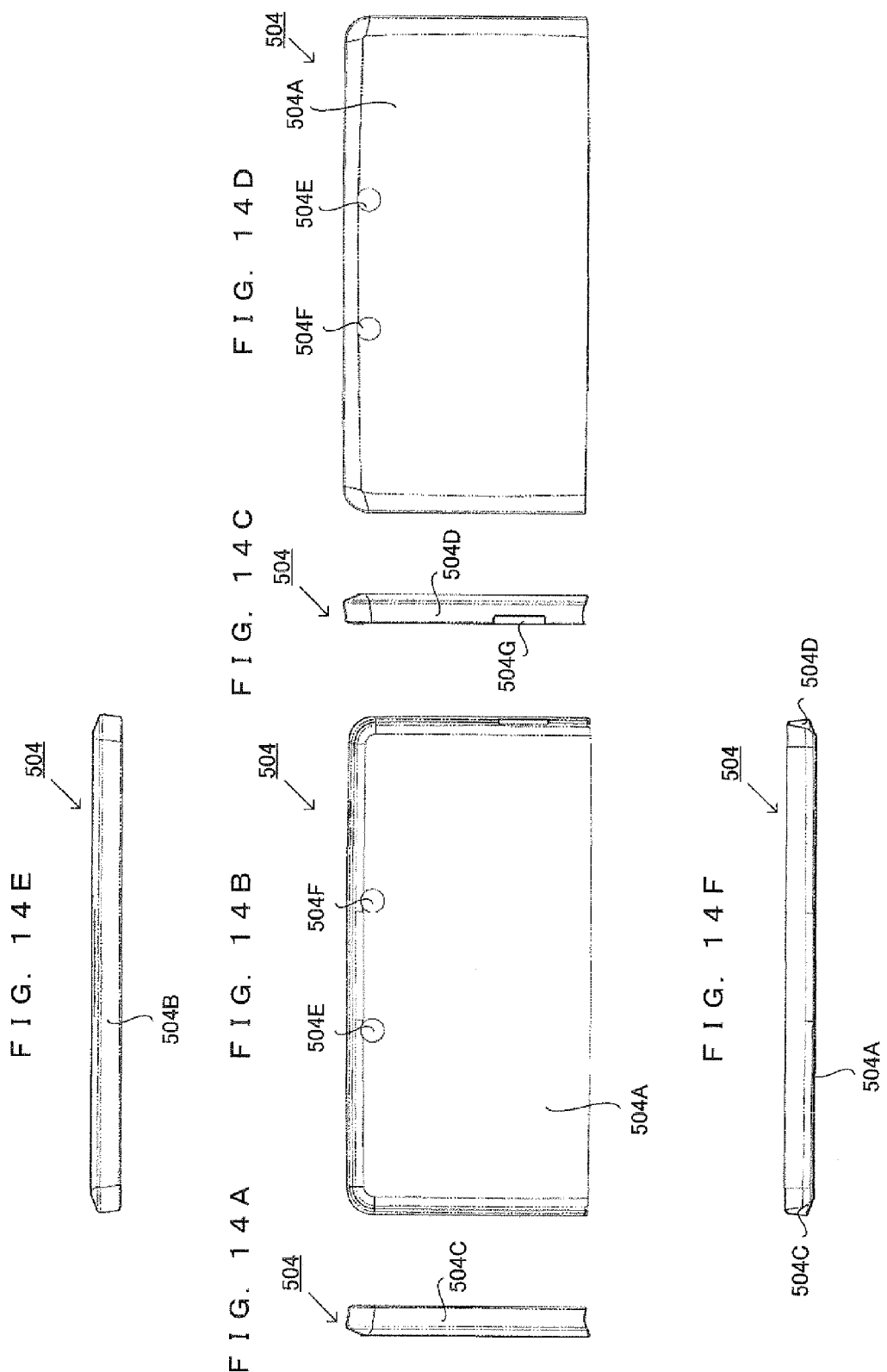

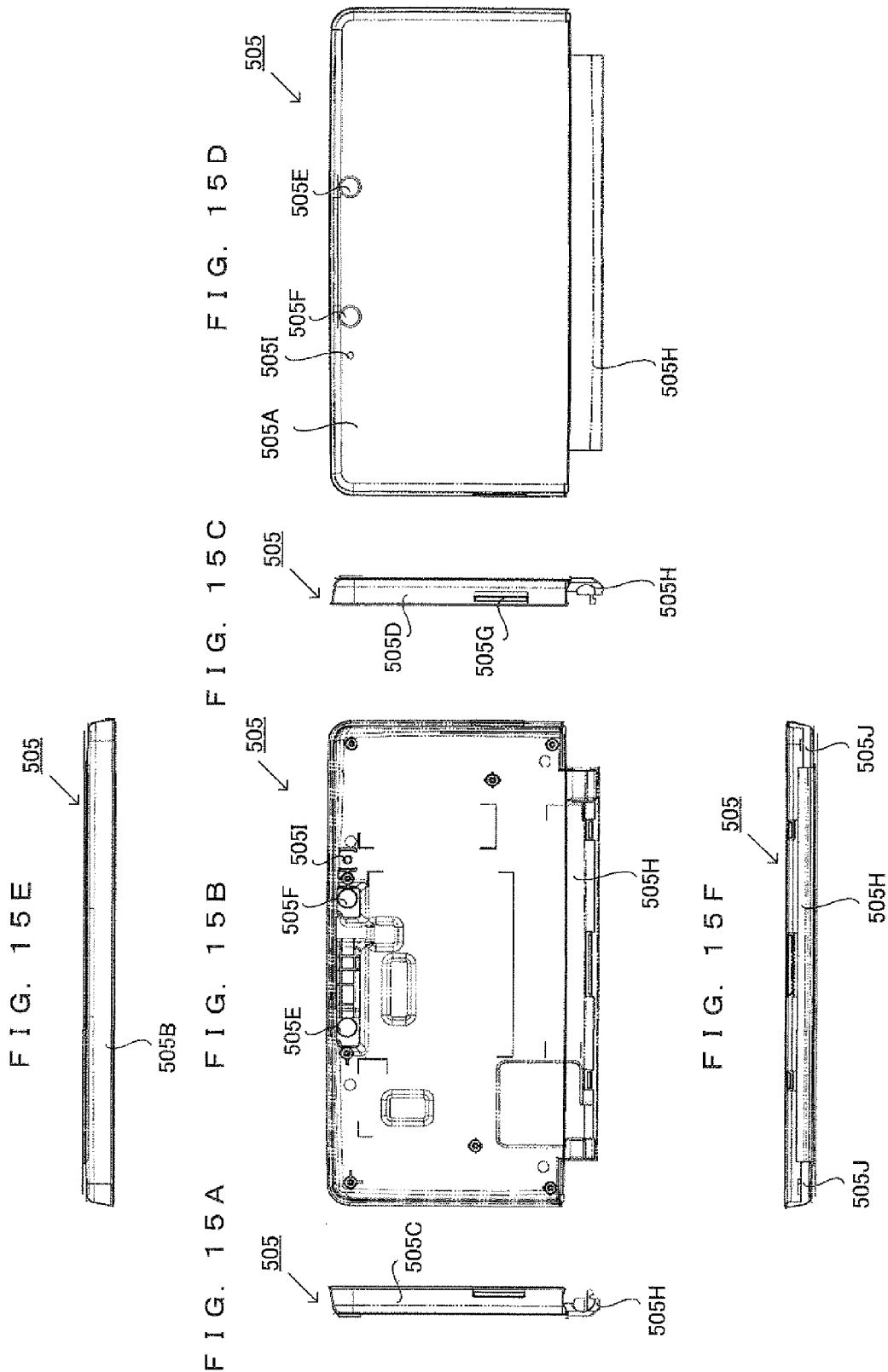

HAND-HELD GAME APPARATUS AND HOUSING PART OF THE SAME

CROSS REFERENCE TO RELATED APPLICATION

The disclosure of Japanese Patent Application No. 2010-134450, filed on Jun. 11, 2010, is incorporated herein by reference.

BACKGROUND OF THE INVENTION

1. Field of the Invention

The present invention relates to a hand-held game apparatus and a housing part of the hand-held game apparatus. More particularly, the present invention relates to a foldable hand-held game apparatus and a housing part of the same.

2. Description of the Background Art

Conventionally, there have been hand-held game apparatuses, each of which is configured such that two housings are foldable. For example, in a game apparatus disclosed in Japanese Patent No. 4260215 (patent document 1), an upper housing and a lower housing provided below the upper housing are foldably connected. Specifically, in the game apparatus disclosed in the patent document 1, each of the upper housing and the lower housing is provided with a display screen, and the lower housing is provided with a variety of operation means. When the game apparatus is used, the upper housing is opened and the lower housing is held by a user. On the other hand, when the game apparatus is not used, the upper housing and the lower housing are folded to allow easy carrying.

As described above, the hand-held game apparatus disclosed in the patent document 1 is configured so as to be closed when not in use to allow easy carrying whereas the upper housing is opened when in use, thereby enhancing operability, portability, and the like. However, further improvement of a game apparatus in terms of operability, portability, a degree of freedom of design, and the like is required of also the hand-held game apparatus disclosed in the patent document 1.

SUMMARY OF THE INVENTION

Therefore, an object of the present invention is to provide a hand-held game apparatus and a housing part thereof which further enhance operability, a degree of freedom of design, and the like.

The present invention has the following features to achieve the object mentioned above. Note that reference numerals indicated between parentheses, supplementary descriptions, and the like are merely provided to facilitate the understanding of the present invention in relation to the later-described embodiment, rather than limiting the present invention in any way.

A first aspect is directed to a group of parts constituting an upper housing (5) and a lower housing (2) included in a hand-held game apparatus (1). The hand-held game apparatus includes the upper housing and the lower housing. The upper housing includes a first component (6) being substantially-rectangular-shaped and a first connecting part (7) protruding from a central portion of a bottom surface of the first component. The lower housing includes a second component (3) being substantially-rectangular-shaped and being a portion on top of which the first component of the upper housing lies when the hand-held game apparatus (1) is folded and a second connecting part (4) being a portion above the second component and having protrusion parts (4a) at both ends. In addition, the lower housing is foldably connected to the upper housing by connecting the second connecting part to the first connecting part.

Housed inside the upper housing are: a first LCD (51) being a naked-eye stereoscopic view display system; an image pickup unit (60) integrally assembled, including a first image pickup device (52) and second and third image pickup devices (56a and 56b) for stereo shooting such that an imaging direction of the first image pickup device is opposite to an imaging direction of each of the second and third image pickup devices for stereo shooting; right and left loudspeakers (54); and a first LED (53) for indicating a display state of a stereoscopic view of the first LCD. In addition, housed inside the lower housing are: a second LCD (21) being a planar view display system, having a display area smaller than a display area of the first LCD, and having mounted thereon a touch panel (22); an analog key (25) and a cross key (23); a first switch, a second switch, a third switch, and a fourth switch (24) arranged in a cross-like manner; a fifth switch, a sixth switch, and a seventh switch (27A, 27B, and 27C) arranged in a linear manner; an eighth switch (37), a ninth switch (35), a second LED (28B), a third LED (28C), and a battery (41); and a memory card readout unit (36) for having attached therein a detachable memory card (SD card) and for reading out data of the memory card.

The group of parts constituting the upper housing and the lower housing of the hand-held game apparatus includes a first part (501), a second part (502), a third part (503), a fourth part (202), a fifth part (201), and a sixth part (203).

The first part has formed therein a third component (501A) having a substantially same shape and a substantially same size as a shape and as a size of a front surface of the first component of the upper housing and arranged inside the upper housing and has formed therein a front surface side part (501B) of the first connecting part of the upper housing.

The second part is flat-plate-like and has a substantially same shape and a substantially same size as the shape and as the size of the front surface of the first component of the upper housing.

The third part includes surfaces (505A, 505B, 505C, and 505D) constituting a back surface, both side surfaces, a top surface, and a bottom surface of the upper housing and includes a back surface side portion (505H) of the first connecting part.

The fourth part includes surfaces constituting back surface side portions of both side surfaces, a back surface side portion of the top surface, and a back surface side portion of the bottom surface of the lower housing.

The fifth part includes surfaces constituting a front surface, front surface side portions of the both side surfaces, a front surface side portion of the top surface, and a front surface side portion of the bottom surface of the lower housing and includes the protrusion parts (4a) of the second connecting part of the lower housing.

The sixth part is flat-plate-like and constitutes the back surface of the lower housing.

The first part including in the third component: a first LCD opening (501C) for exposing a display part of the first LCD in a front surface direction; a front surface image pickup device opening (501D) for exposing the first image pickup device of the image pickup unit in the front surface direction; loudspeaker openings (501E and 501F) for exposing the loudspeakers in the front surface direction; a first LED opening (501G) for exposing the first LED in the front surface direction; and screw holes (501I).

The second part is a resin member whose at least regions corresponding to the first LCD opening and the front surface image pickup device opening are transparent and whose at least region corresponding to the first LED opening has been subjected to printing which causes inscription to appear transparent. In addition, the second part includes holes (502A) in regions corresponding to the loudspeaker openings.

The third part includes: the surfaces constituting the back surface, the both side surfaces, the top surface, and the bottom surface of the upper housing; and a recess, for housing the third component of the first part and the second part with the one on top of the other, formed by the both side surfaces, the top surface, and the bottom surface thereof.

The fourth part includes on a back surface side a recess (202A) having a size, as viewed from the front, larger than 70% of a size of the back surface of the lower housing, as viewed from the front. The fourth part includes in the recess: a battery housing part (202B) for housing the battery so as to allow the battery to be taken out from a back surface direction; first screw holes, the number of which is n; second screw holes, the number of which is m (m is smaller than n); and hook slots (202E). In addition, the fourth part includes in a side surface thereof an opening (202F) for inserting the detachable memory card (SD card) into the memory card readout unit (36) housed in the lower housing, and the opening (202F) is covered by a lid member (36a) which is opened and closed in the back surface direction and is formed such that a front surface side thereof is open.

The fifth part includes in the front surface: a second LCD opening (201A), for exposing the second LCD in the front surface direction, having an opening area smaller than an opening area of the first LCD opening; an analog key opening (201C) for exposing an operation part of the analog key in the front surface direction; a cross key opening (201B) for exposing an operation part of the cross key in the front surface direction; a first switch opening, a second switch opening, a third switch opening, and a fourth switch opening (201E), for exposing operation parts of the first switch, the second switch, the third switch, and the fourth switch in the front surface direction, arranged in a cross-like manner; a fifth switch opening, a sixth switch opening, and a seventh switch opening (201G), for exposing operation parts of the fifth switch, the sixth switch, and the seventh switch in the front surface direction, arranged in a linear manner; and a sheet key top mounting part (201H), for mounting a sheet key top covering upper portions of the fifth switch opening, the sixth switch opening, and the seventh switch opening, including thereinside the fifth switch opening, the sixth switch opening, and the seventh switch opening, the sheet key top being integrally formed and horizontally long.

The second LCD opening and the sheet key top mounting part are arranged such that in a rectangular region (201I) arranged in a substantially central portion of the front surface of the fifth part, the second LCD opening is placed in an upper region of the rectangular region and the sheet key top mounting part is placed in an lower region of the rectangular region in a manner adjacent to each other.

In addition, the fifth part includes in one of the side surfaces: an eighth switch opening (201L) for exposing an operation part of the eighth switch in a side surface direction; and a second LED opening (201M) for guiding emitted light of the second LED and for arranging a lens member so as to protrude from the opening.

In addition, the fifth part includes in the other of the side surfaces a ninth switch opening (201J) for protruding an operation part of the ninth switch in a side surface direction.

In addition, the fifth part includes in the bottom surface a third LED opening (201N) for guiding emitted light of the third. LED and for arranging a lens member so as to protrude from the opening. Further, the fifth part includes screw holes, the number of which is n, corresponding to the first screw holes.

The sixth part is a flat plate having a size corresponding to a size of the recess of the fourth part. In addition, the sixth part includes screw holes (203A), the number of which is m, corresponding to the second screw holes of the fourth part.

In addition, horizontal and vertical dimensions ($X1$ and $Y1$) of front surface edges of a portion corresponding to the second component of the fifth part (201) are made smaller than horizontal and vertical dimensions ($X2$ and $Y2$) of front surface edges of a portion corresponding to the first component of the third part. Further, horizontal and vertical dimensions ($X3$ and $Y3$) of back surface edges of the portion corresponding to the second component of the fifth part are made smaller than horizontal and vertical dimensions ($X4$ and $Y4$) of front surface edges of a portion corresponding to the second component of the fourth part.

When the hand-held game apparatus is folded, front surface edges of side surfaces of the fifth part are located inside front surface edges of side surfaces of the third part, front surface edges of a bottom surface of the fifth part are located inside front surface edges of a top surface of the third part, further, back surface edges of side surfaces of the fifth part are located inside front surface edges of side surfaces of the fourth part, and further, back surface edges of the bottom surface of the fifth part are located inside front surface edges of a bottom surface of the fourth part, thereby forming recesses (middle layer) in middle portions of side surfaces and a bottom surface of the hand-held game apparatus when folded.

According to the first aspect, the hand-held game apparatus can be configured so as to have a three-layered structure (three layers of the upper housing, a front surface side of the lower housing, and a back surface side of the lower housing) when folded, and by making a size of the middle layer smaller than sizes of the other layers, the side surfaces and the bottom surface can be formed so as to be recessed. Owing to these recessed side surfaces and bottom surface, the following numerous effects can be attained.

In the middle layer, the eighth switch (wireless slider switch) and the ninth switch (sound volume switch) are arranged, thereby allowing a reduction in likelihood of erroneously operating these switches. In addition, since the recesses are formed in the side surfaces and the bottom surface so as to be wide-ranging and continuous, by utilizing the recesses as a guide (by touching any of the recesses and sliding a finger from the touched recess), these switches can be touched and operated without visually checking these switches.
  Since lenses of the LED lights can be protruded from the middle layer, a lighting state of each of these lights can be checked from the front, and it can be prevented or reduced that the lenses are protruded from the side surfaces and the bottom surface in a state where the hand-held game apparatus is folded.
  Since a finger(s) can be hitched to the recesses, it is easy to open and close the upper housing.
  When the lid member of the memory card is opened, owing to the recesses, an edge portion of the lid member can be picked up with a finger, thereby facilitating opening of the lid member.
  Since the three layers are formed of separate parts, it is easy for the three layers to have different colors, thereby allowing the hand-held game apparatus to be rich in color variations.

As described above, according to the first aspect, operability and the like of the hand-held game apparatus can be enhanced.

In addition, by configuring the substantially whole of the front surface of the upper housing so as to be covered by the second part having the transparent regions, the following numerous effects can be attained.

The presence of the first LCD of the stereoscopic view display system can be highlighted, thereby allowing the appeal of the hand-held game apparatus to be conveyed to a user.

Since the above-mentioned surface also serves as a lens cover for the image pickup part, it is unnecessary to separately mount the lens cover.

Printing processes for the LEDs can be made efficient.

The screws exposed from the front surface of the upper housing can be decreased or eliminated.

In addition, by making a size of the sixth part (battery lid) in the back surface of the lower housing large, the following numerous effects can be attained.

The screws exposed from the back surface of the lower housing can be decreased.

Since the above-mentioned part is a separate part widely covering the back surface, a wide-raging portion of the back surface can be made so as to have a different color.

In addition, since the sheet key is provided so as to be formed integrally with the LCD having the touch panel mounted thereon and is provided as if the sheet key is a part of a key of the touch panel and the sheet key serves as a key top which covers the upper portions of the three switches, an impression in which there are many switches can be alleviated, thereby allowing erroneous operations and confusion to be prevented.

In other words, through configuring the hand-held game apparatus by using the above-mentioned parts, operability and the like of the hand-held game apparatus can be provided and the hand-held game apparatus a lot of design variations can be provided.

The second aspect may be directed to the above-described first part constituting the upper housing among the group of parts constituting the upper housing and the lower housing.

The third aspect may be directed to the above-described second part constituting the upper housing among the group of parts constituting the upper housing and the lower housing.

The fourth aspect may be directed to the above-described third part constituting the upper housing among the group of parts constituting the upper housing and the lower housing.

The fifth aspect may be directed to the above-described fourth part constituting the lower housing among the group of parts constituting the upper housing and the lower housing.

The sixth aspect may be directed to the above-described fifth part constituting the lower housing among the group of parts constituting the upper housing and the lower housing.

The seventh aspect may be directed to the above-described sixth part constituting the lower housing among the group of parts constituting the upper housing and the lower housing.

The eighth aspect may be directed to the above-described hand-held game apparatus configured by the above-described group of parts constituting the upper housing and the lower housing.

According to the present invention, operability, a degree of freedom of design, and the like of the hand-held game apparatus can be enhanced.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 6A to 6F show a left side view, a front view, a right side view, a back view, a top view, and a bottom view of an upper housing 5;

FIGS. 9A to 9F show a left side view, a front view, a right side view, a back view, a top view, and a bottom view of a fifth part 201 constituting the lower housing 2;

FIGS. 10A to 10F show a left side view, a front view, a right side view, a back view, a top view, and a bottom view of a fourth part 202 constituting the lower housing 2;

FIG. 10G is a diagram illustrating an enlarged view of the opening 202F formed in the left side surface of the fourth part 202;

FIGS. 11A to 11F show a left side view, a front view, a right side view, a back view, a top view, and a bottom view of a sixth part 203 constituting the lower housing 2;

FIGS. 12A to 12F show a left side view, a front view, a right side view, a back view, a top view, and a bottom view of a first part 501 constituting the upper housing 5;

FIGS. 13A to 13G show a left side view, a front view, a right side view, a back view, a top view, and a bottom view of a second part 502 constituting the upper housing 5 and shows a front view in a case where the second part has been subjected to printing;

FIGS. 14A to 14F show a left side view, a front view, a right side view, a back view, a top view, and a bottom view of a third A part 504 constituting the upper housing 5;

FIGS. 15A to 15F show a left side view, a front view, a right side view, a back view, a top view, and a bottom view of a third B part 505 constituting the upper housing 5;

DESCRIPTION OF THE PREFERRED EMBODIMENTS (Configuration of Game Apparatus)

Figure 1:
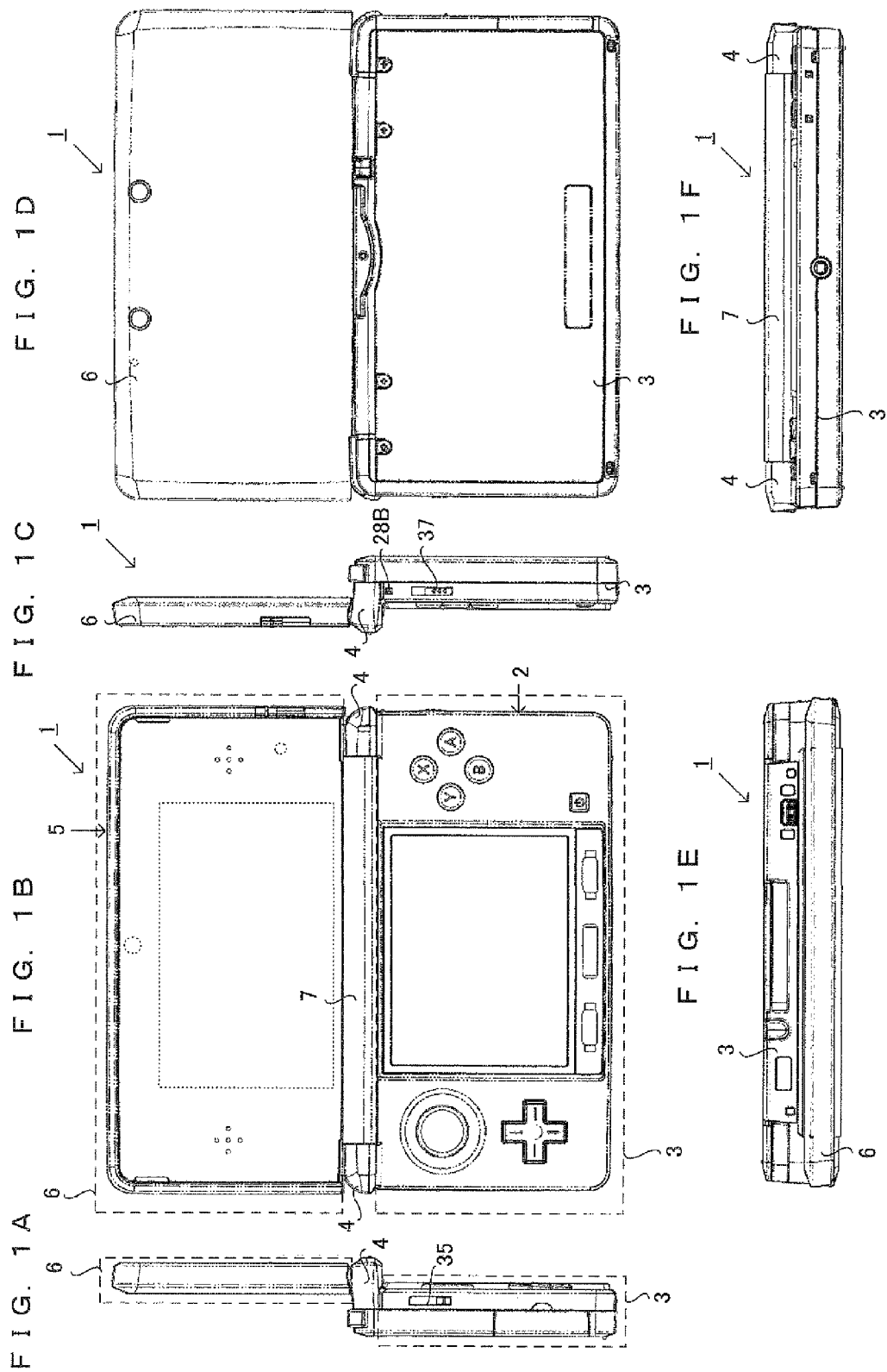
FIGS. 1A to 1F show a left side view, a front view, a right side view, a back view, a top view, and a bottom view of a game apparatus 1 in an open state.
Figure 2:
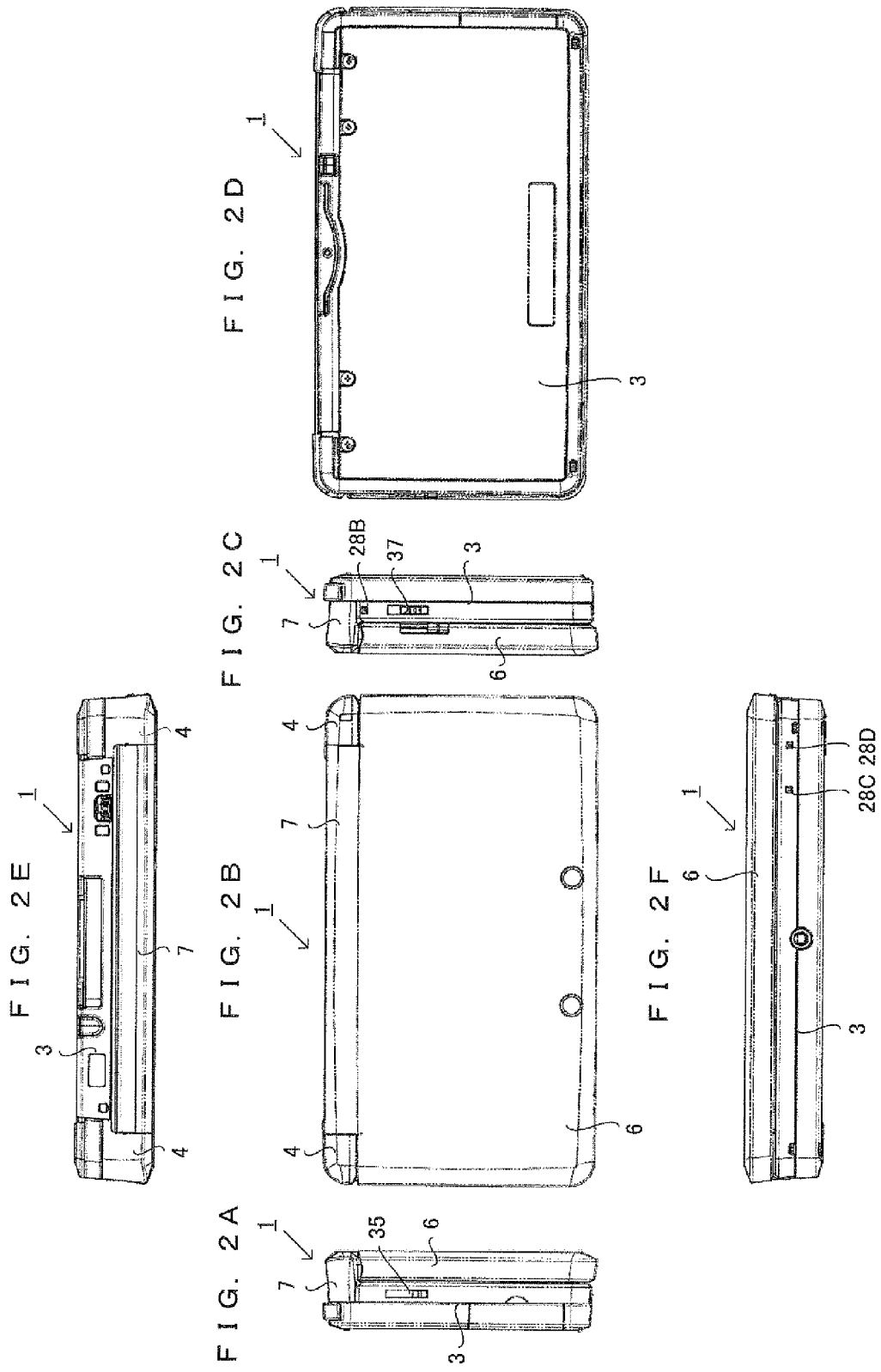
FIGS. 2A to 2F show a left side view, a front view, a right side view, a back view, a top view, and a bottom view of the game apparatus 1 in a closed state.

Hereinafter, a game apparatus according to one embodiment of the present invention will be described. FIG. 1 and FIG. 2 are diagrams, each illustrating an external view of the game apparatus 1. The game apparatus 1 is a hand-held game apparatus and is foldably configured as shown in FIG. 1 and FIG. 2. The game apparatus 1 is operable to shoot an image by means of a camera, to display the shot image on a screen, and to store data of the shot image. In addition, the game apparatus 1 is operable to execute a game program stored in an exchangeable memory card or a game program received from a server or from other game apparatus and to display an image generated by computer graphics processing, such as an image shot by a virtual camera which is set in a virtual space.

FIG. 1A is a left side view of the game apparatus 1 in an open state; FIG. 1B is a front view of the game apparatus 1 in the open state; FIG. 1C is a right side view of the game apparatus 1 in the open state; FIG. 1D is a back view of the game apparatus 1 in the open state; FIG. 1E is a top view of the game apparatus 1 in the open state; and FIG. 1F is a bottom view of the game apparatus 1 in the open state. FIG. 2A is a left side view of the game apparatus 1 in a closed state; FIG. 2B is a front view of the game apparatus 1 in the closed state; FIG. 2C is a right side view of the game apparatus 1 in the closed state; FIG. 2D is a back view of the game apparatus 1 in the closed state; FIG. 2E is a top view of the game apparatus 1 in the closed state; and FIG. 2F is a bottom view of the game apparatus 1 in the closed state.

As shown in FIG. 1 and FIG. 2, the game apparatus 1 has a lower housing 2 and an upper housing 5. The lower housing 2 and the upper housing 5 are connected in an openable and closeable (foldable) manner. In the present embodiment, each of the lower housing 2 and the upper housing 5 is of a shape of a horizontally-long rectangular plate, and a long side portion of the lower housing 2 and a long side portion of the upper housing 5 are mutually connected in a pivotable manner.

Specifically, as shown in FIG. 1 and FIG. 2, the upper housing 5 has a substantially-rectangular-shaped first component 6 (a portion enclosed by a broken line) and a first connecting part 7 which protrudes from a central portion of a bottom surface of the first component 6 in a direction perpendicular to the bottom surface. The first component 6 can also be defined as a part of the upper housing 5, which is other than the first connecting part 7 (a part of the upper housing 5 in the open state, which is located above an upper edge of the first connecting part 7, as viewed from the front; or a part below a lower edge of the first connecting part 7 in the closed state). In addition, the lower housing 2 has a substantially-rectangular-shaped second component 3 (a portion enclosed by a broken line) and a second connecting part 4 above the second component 3.

The second connecting part 4 has, at both ends, protrusion parts 4a protruding in a direction perpendicular to an inner surface (surface which comes to be located on an inner side when the upper housing 5 and the lower housing 2 are folded) of the second component 3 and a depression part 4b which receives the first connecting part 7 (refer to FIG. 3B). In other words, as shown in FIG. 3B, the second connecting part 4 is a part which includes the protrusion parts 4a provided at the both ends and the depression part 4b and is a part of the lower housing 2, which is located above an upper edge of the substantially-rectangular-shaped second component 3. The first connecting part 7 of the upper housing 5 is received by the depression part 4b of the second connecting part 4 of the lower housing 2, and the first connecting part 7 of the upper housing 5 and the protrusion parts 4a of the second connecting part 4 of the lower housing 2 are connected by a hinge pin 59 (refer to FIG. 7 and FIG. 8), whereby the upper housing 5 and the lower housing 2 are foldably connected. When the upper housing 5 and the lower housing 2 are folded, the above-mentioned first component 6 of the upper housing 5 lie on top of the above-mentioned second component 3 of the lower housing 2.

On the other hand, the second component 3 is a part of the lower housing 2, which is located below lower edges of the protrusion parts 4a of the lower housing 2, as viewed from the front. The protrusion parts 4a of the lower housing 2 and a protrusion (first connecting part 7) of the upper housing 5 are joined and constitute a connecting part for folding the hand-held game apparatus 1. More specifically, the lower edges of the protrusion parts 4a of the lower housing 2 and a lower edge of the protrusion of the upper housing 5 are joined so as to coincide with each other. Therefore, in other words, the first component 6 is a part of the upper housing 5, which is located above the connecting part in the open state (a part, which is located therebelow in the closed state), and the second component 3 is a part of the lower housing 2, which is located below the connecting part.

The lower housing 2 is held by one or both of a user's hands. The game apparatus 1 is held by a user such that inner surfaces of the lower housing 2 and the upper housing 5, which are located thereinside when the lower housing 2 and the upper housing 5 are folded, are located in the front; and the lower housing 2 is located on a lower side and the upper housing 5 is located on an upper side. In other words, when used by a user, the game apparatus 1 is set in the open state (FIG. 1) and is held such that the inner surfaces of the lower housing 2 and the upper housing 5 are located in the front; and the lower housing 2 is located on the lower side and the upper housing 5 is located on the upper side (refer to FIG. 21).

(Description of Lower Housing)

Figure 3:
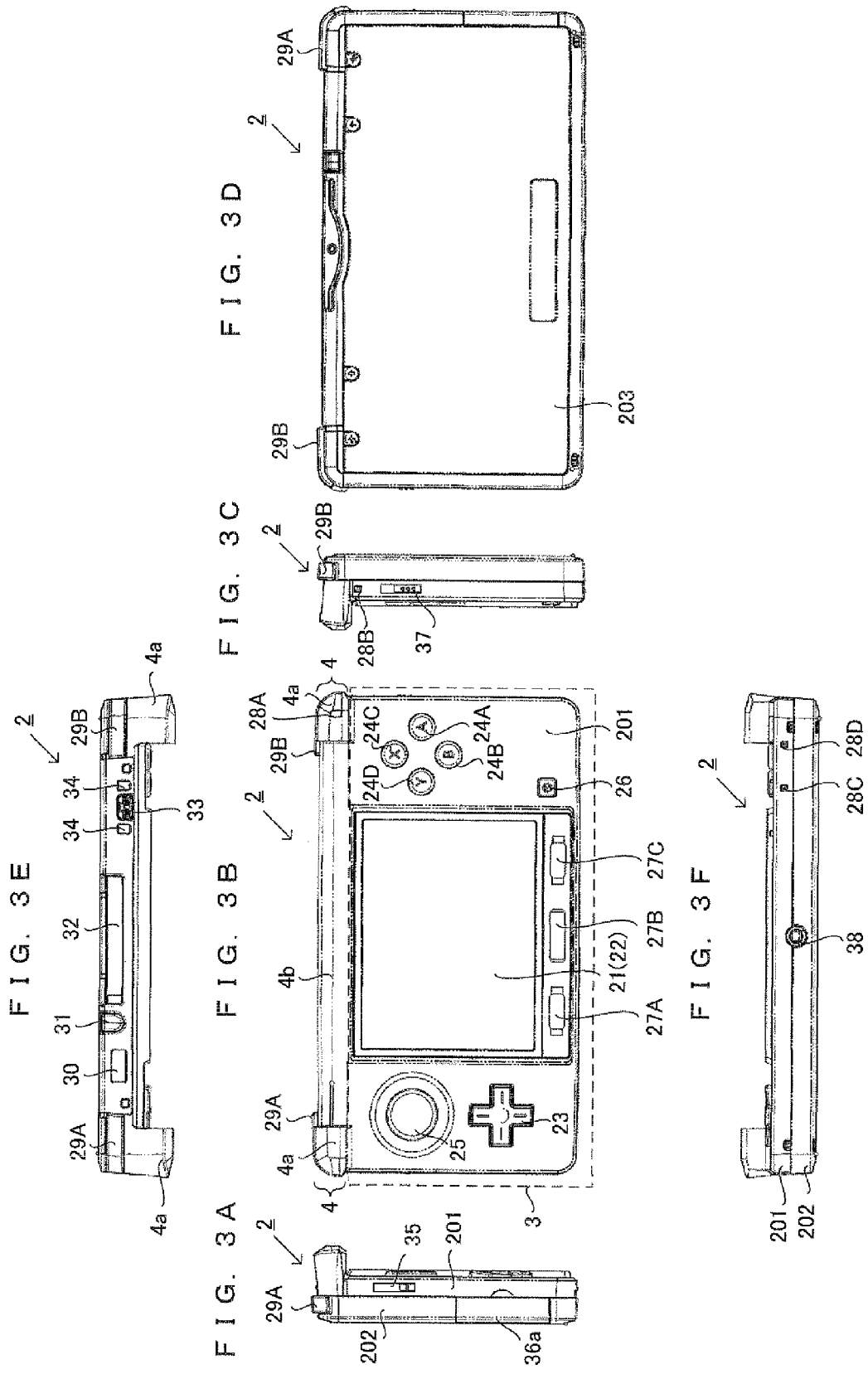
FIGS. 3A to 3F show a left side view, a front view, a right side view, a back view, a top view, and a bottom view of a lower housing 2.
Figure 4:
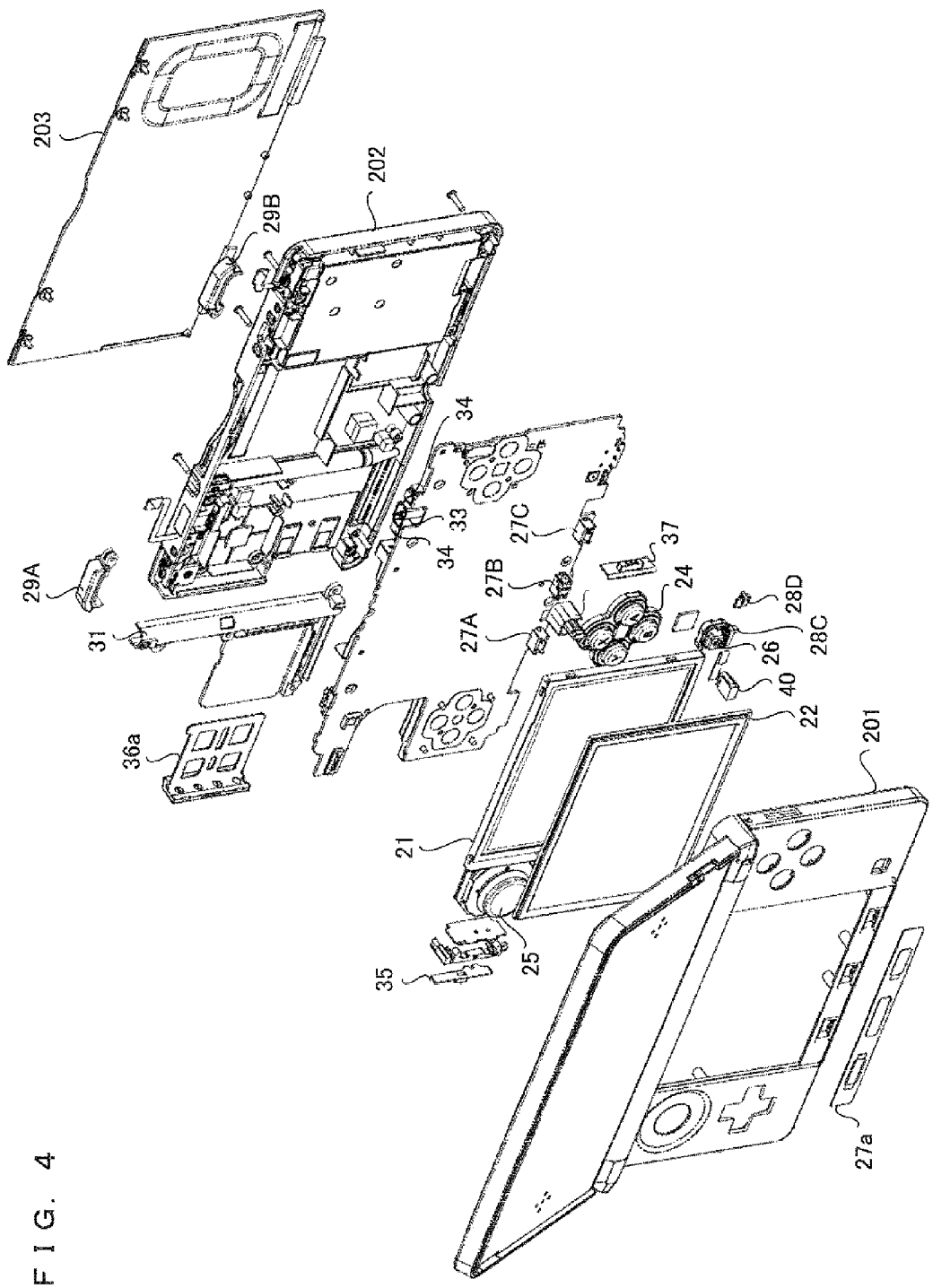
FIG. 4 shows an exploded perspective view of the lower housing 2, as viewed from the front.
Figure 5:
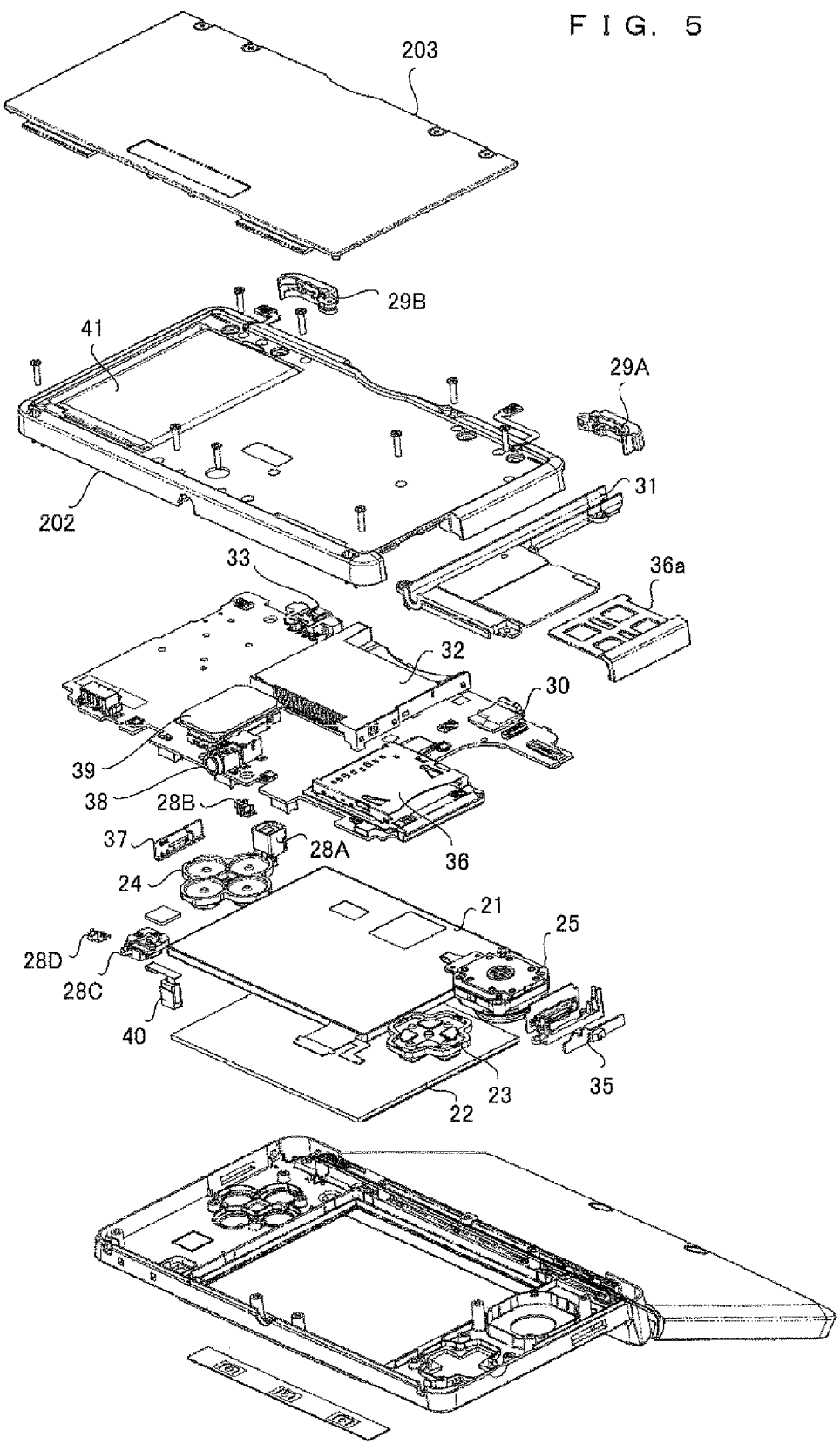
FIG. 5 shows an exploded perspective view of the lower housing 2, as viewed from the back.

First, with reference to FIG. 3 through FIG. 5, the lower housing 2 will be described. FIG. 3A is a left side view of the lower housing 2; FIG. 3B is a front view of the lower housing 2; FIG. 3C is a right side view of the lower housing 2; FIG. 3D is a back view of the lower housing 2; FIG. 3E is a top view of the lower housing 2; and FIG. 3F is a bottom view of the lower housing 2. In addition, FIG. 4 is an exploded perspective view of the lower housing 2, as viewed from the front. FIG. 5 is an exploded perspective view of the lower housing 2, as viewed from the back.

As shown in FIG. 3 through FIG. 5, a fifth part 201, a fourth part 202, and a sixth part 203 constitute the lower housing 2. Each of the fifth part 201, the fourth part 202, and the sixth part 203 is integrally molded. The fifth part 201 is a part which includes a front surface (an inner surface; an inner surface of the second component 3 of the lower housing 2) of the lower housing 2, the second connecting part 4, a front surface side portion of a right side surface of the lower housing 2, a front surface side portion of a left side surface thereof, a front surface side portion of the front surface thereof, and a front surface side portion of a bottom surface thereof. The fourth part 202 is a part which includes a back surface portion of a right side surface, a back surface side portion of a left side surface, a back surface side portion of a top surface, and a back surface side portion of a bottom surface of the lower housing 2. The sixth part 203 is a member which a back surface of the lower housing 2 constitutes and is substantially-rectangular-shaped and flat-plate-like. The fifth part 201, the fourth part 202, and the sixth part 203 are assembled, thereby forming the lower housing 2. Details of the parts 201 through 203 constituting the lower housing 2 will be described later.

As shown in FIG. 3B, on the inner surface (the inner surface of the second component 3) of the lower housing 2, a lower side LCD (Liquid Crystal Display) 21, a touch panel 22, a cross key 23, operation buttons 24A, 24B, 24C, and 24D (an operation button unit 24; refer to FIG. 4), an analog key 25, a power button 26, a select button 27A, a HOME button 27B, and a start button 27C are provided. In addition, on a right side of the second connecting part 4 of the lower housing 2, a notification LED 28A is provided. In addition, as shown in FIG. 3E, in a top surface of the lower housing 2, an L button 29A, an R button 29B, an infrared-ray communication module 30, an insertion slot of a touch pen holder 31, an insertion slot for inserting a game card into a game card unit 32, a power connector 33, and a cradle connecting terminal 34 are provided. In addition, as shown in FIG. 3A, in a left side surface of the lower housing 2, a sound volume switch 35, and an insertion slot (not shown) for inserting an SD card into an SD card unit 36 are provided. The insertion slot of the SD card unit 36 is covered by a cover 36a formed of an elastomer. In addition, as shown in FIG. 3C, in a right side surface of the lower housing 2, a wireless switch 37 and a wireless LED 28B are provided. In addition, as shown in FIG. 3F, in a bottom surface of the lower housing 2, a power LED 28C, a charge LED 28D, and an earphone jack 38 are provided. The above-mentioned parts 21 through 38 are housed in the lower housing 2. In addition, inside the lower housing 2, a wireless communication module 39, a microphone 40, a battery 41 (refer to FIG. 4 and FIG. 5), an information processing part 42, and the like are housed. Hereinafter, details of these parts will be described.

The lower side LCD 21 is of a horizontally-long shape and is arranged such that a long-side direction thereof coincides with a long-side direction of the lower housing 2. The lower side LCD 21 is arranged in a central portion of the lower housing 2. When the game apparatus 1 is not in use, the closed state is set, thereby allowing a screen of the lower side LCD 21 to be prevented from becoming soiled or scratched. The lower side LCD 21 is a display device which has a predetermined resolution and, unlike the later-described upper side LCD 51, displays an image in a planar manner (not allowing an image to be displayed in a stereoscopic manner). In the present embodiment, as the display devices, the LCDs are used. However, any other display devices such as a display device utilizing EL (Electro Luminescence) may be used.

On the screen of the lower side LCD 21, the touch panel 22 is attached. The touch panel 22 detects coordinates of a position on an input screen of the touch panel 22, at which inputting is performed. In the present embodiment, the touch panel 22 is a resistive touch panel. However, the touch panel is not limited to the resistive touch panel, and a touch panel of any type, for example, such as a capacitive touch panel, may be used. In the present embodiment, as the touch panel 22, a touch panel having the same resolution (detection accuracy) as that of the lower side LCD 21 is used. However, it is not necessarily required that the resolution of the touch panel 22 is the same as that of the lower side LCD 21. A touch pen (not shown) used for performing operations on the touch panel 22 is inserted into the touch pen holder 31 and housed therein. Inputting onto the touch panel 22 can be performed by not only the touch pen but also a finger of a user.

On a left side of the lower side LCD 21, the cross key 23 is arranged, and in a position above the cross key 23, the analog key 25 is arranged (FIG. 3B). More specifically, the analog key 25 is provided in an upper region of a left region beside the lower side LCD 21, and the cross key 23 is provided in a lower region of the left region beside the lower side LCD 21. In addition, the analog key 25 and the cross key 23 are designed so as to be located in positions where a thumb of a left hand holding the lower housing can perform operations. The analog key 25 is provided in the upper region thereof, whereby the analog key 25 is arranged in a position where the thumb of the left hand holding the lower housing 2 is naturally located and the cross key 23 is arranged in a position where the thumb of the left hand is shifted slightly downward (refer to FIG. 21). The cross key 23 is a cross-shaped key and is used for specifying up, down, right, and left directions. The cross key 23 allows inputting of the up, down, right, and left directions. In addition, the analog key 25 is a key which can be slid 360 degrees in any direction in parallel with the inner surface of the lower housing 2 and is used for specifying any direction. The analog key 25 and the cross key 23 function in accordance with a program executed by the game apparatus 1. For example, in a case where a game in which a predetermined object appears in a three-dimensional virtual space is executed by the game apparatus 1, the analog key 25 functions as an input device for moving the predetermined object within the three-dimensional virtual space. In this case, the predetermined object is moved in accordance with a direction in which a key top of the analog key 25 is slid.

On a right side of the lower side LCD 21, the operation buttons 24A, 24B, 24C, and 24D are arranged in upper, lower, right, and left positions in a cross-like manner. More specifically, the operation buttons 24A, 24B, 24C, and 24D are arranged in an upper region of a right region beside the lower side LCD 21. The operation buttons 24A, 24B, 24C, and 24D are designed so as to be in positions where a thumb of a right hand can perform operations when a user holds the lower housing 2. Functions in accordance with a program executed by the game apparatus 1 are appropriately assigned to the operation buttons 24A, 24B, 24C, and 24D. For example, the operation buttons 24A, 24B, 24C, and 24D are used for performing a determination operation, a cancellation operation, and the like. In addition, in a right lower position of the right region beside the lower side LCD 21, the power button 26 is arranged. The power button 26 is a button for turning on and off of the power of the game apparatus 1 or proceeding to a sleep state thereof.

On a lower side of the lower side LCD 21, the select button 27A, the HOME button 27B, and the start button 27C are arranged. Upper portions of the buttons 27A, 27B, and 27C are covered by a sheet key 27a which is integrally formed and is horizontally long. In other words, the sheet key 27a is a key top of these buttons. Functions in accordance with a program executed by the game apparatus 1 are appropriately assigned to the buttons 27A, 27B, and 27C. Far example, the start button 27C is used when a game executed by the game apparatus 1 is started, and the HOME button is used when a game being played is suspended or stopped and an operation for returning to a menu of the hand-held game apparatus is performed.

In addition, on a right side of the second connecting part 4 of the lower housing 2 as viewed from the front, the notification LED 28A is provided. The notification LED 28A is used for notifying a user that the game apparatus 1 enters a predetermined state. For example, when the game apparatus 1 enters a predetermined state through communication with other apparatus (for example, in a case where data such as a message is received from other apparatus through wireless communication, and the like), the notification LED 28A is lit up.

At a left end portion of a top surface of the lower housing 2, the L button 29A is arranged, and at a right end portion of the top surface of the lower housing 2, the R button 29B is arranged. Functions in accordance with a program executed by the game apparatus 1 are appropriately assigned to the L button 29A and the R button 29B. In addition, in the top surface of the lower housing 2, the infrared-ray communication module 30, the insertion slot of the touch pen holder 31, the insertion slot for inserting a game card into the game card unit 32, the power connector 33, and the cradle connecting terminal 34 are provided. The infrared-ray communication module 30 is a communication module for transmitting and receiving data and the like to and from other apparatus through infrared-ray communication. Detachably attached to the game card unit 32 is the game card (not shown) which is a nonvolatile memory. The game card having stored therein a predetermined game program is attached to the game card unit 32, whereby the game program is loaded and executed. A power cable, not shown, is connected to the power connector 33, whereby supplying power to the game apparatus 1 and charging the battery 41 are conducted. In addition, the cradle connecting terminal 34 is a terminal for electrically connecting to cradles (not shown) used for charging and for connections and the like with peripheral devices.

In the left side surface of the lower housing 2, the sound volume switch 35 and the insertion slot (the later-described opening 202F) for inserting the SD card (not shown) into the SD card unit 36 are provided. The sound volume switch 35 has an operation part which can be slid in up-and-down directions (up-and-down directions when the hand-held game apparatus 1 is in use; and up-and-down directions on a plane of paper of FIG. 3) and is a switch for adjusting a volume of sound outputted from loudspeakers 54 (refer to FIG. 7). Detachably attached to the SD card unit 36 is the SD card which is a nonvolatile memory. The SD card unit 36 reads and writes data from and to the SD card. The insertion slot for inserting the SD card into the SD card unit 36 is covered by the cover 36a.

In the right side surface of the lower housing 2, the wireless switch 37 and the wireless LED 28B are provided. The game apparatus 1 has a function which allows connection to a wireless LAN through, for example, a system in conformity with standards of IEEE802.11.b/g. The wireless switch (wireless slide switch) 37 has an operation part which can be slid in up-and-down directions (up-and-down directions when the hand-held game apparatus 1 is in use; and up-and-down directions on a plane of paper of FIG. 3) and is a switch which enables/disables the function of this wireless communication. The wireless LED 28B indicates whether or not the wireless communication is established, and specifically, is lit up when the wireless communication is established, or the wireless LED 28B is lit up when the function of the wireless communication is enabled.

In the bottom surface of the lower housing 2, the power LED 28C, the charge LED 28D, and the earphone jack 38 are provided. The power LED 28C is lit up when the power of the game apparatus 1 is on. The charge LED 28D is lit up when the game apparatus 1 is being charged. Connected to the earphone jack 38 are earphones (not shown). When the earphones are connected to the earphone jack 38, the game apparatus 1 outputs sound from the earphones, not from the loudspeakers 54.

Figure 23:
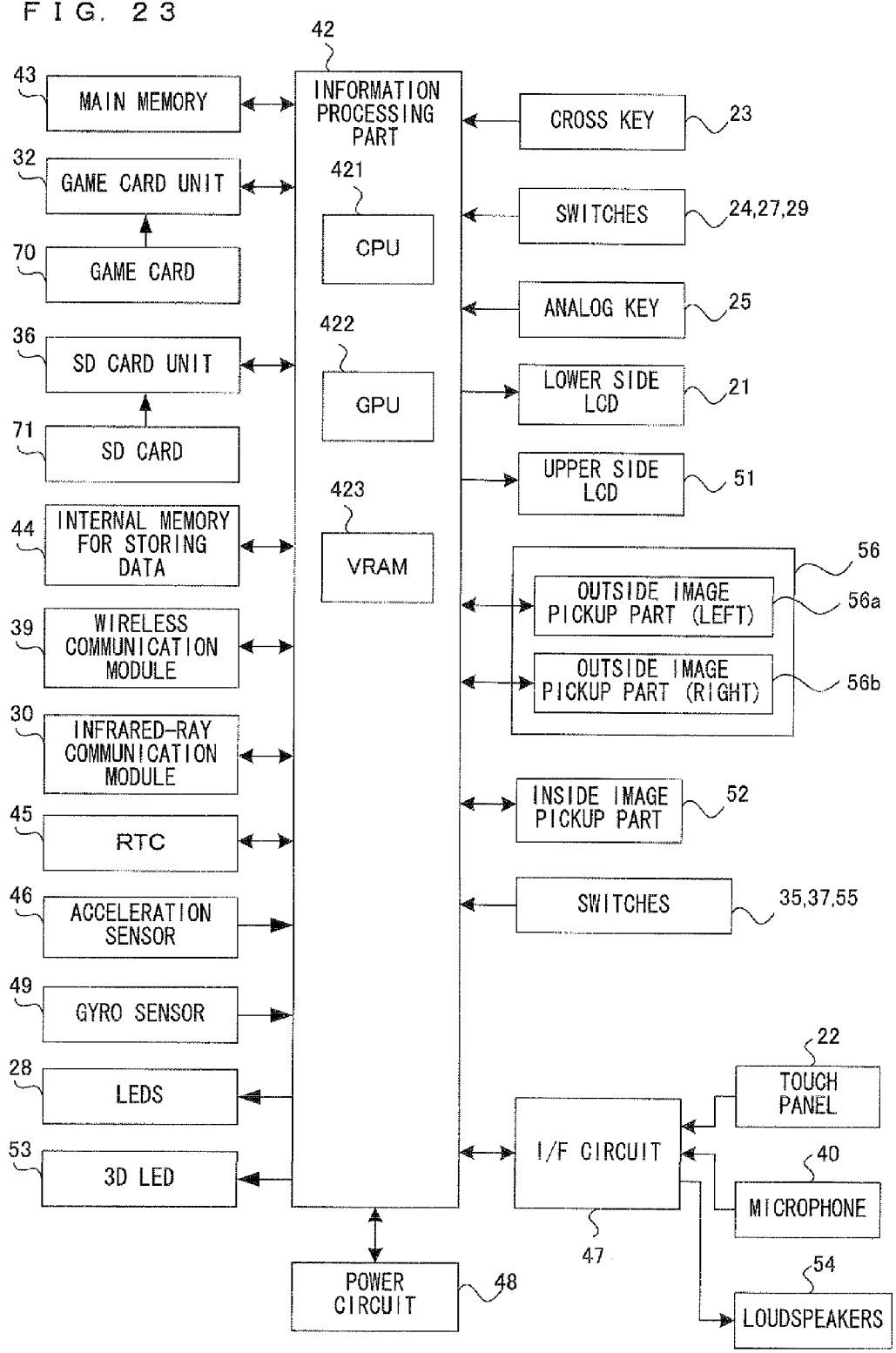
FIG. 23 is a block diagram illustrating an internal configuration of the game apparatus 1.

In addition, though not shown, housed inside the lower housing 2 are the later-described information processing part 42, a main memory 43, an internal memory 44 for storing data, an RTC 45, an acceleration sensor 46, a gyro sensor 49, an interface (I/F) circuit 47, a power circuit 48, and the like (refer to FIG. 23). The information processing part 42 is a semiconductor chip on which a CPU (Central Processing Unit) 421, a GPU (Graphics Processing Unit) 422, a VRAM (Video RAM) 423, and the like are implemented. These information processing part 42, the main memory 43, and the like are arranged, for example, on a back side of the game card unit 32 (a lower side in FIG. 5).

(Description of Upper Housing)

Figure 7:
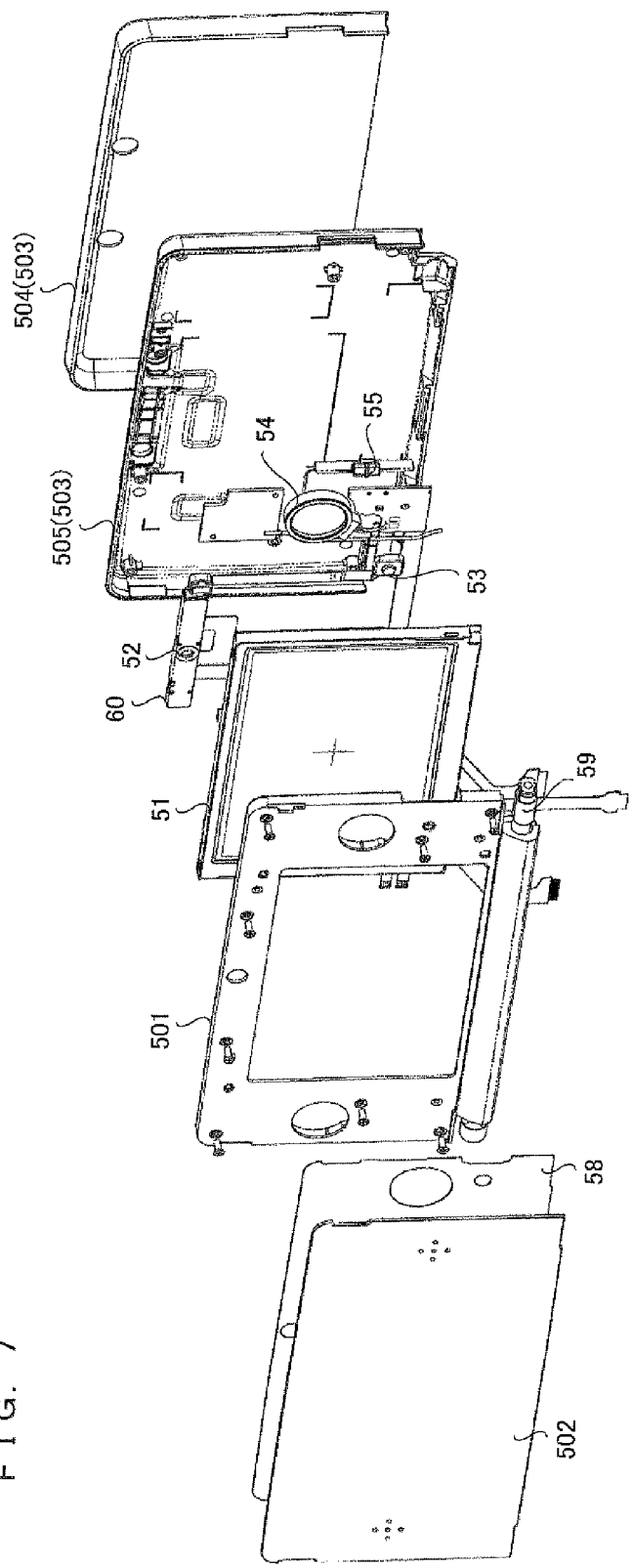
FIG. 7 shows an exploded perspective view of the upper housing 5, as viewed from the front.
Figure 8:
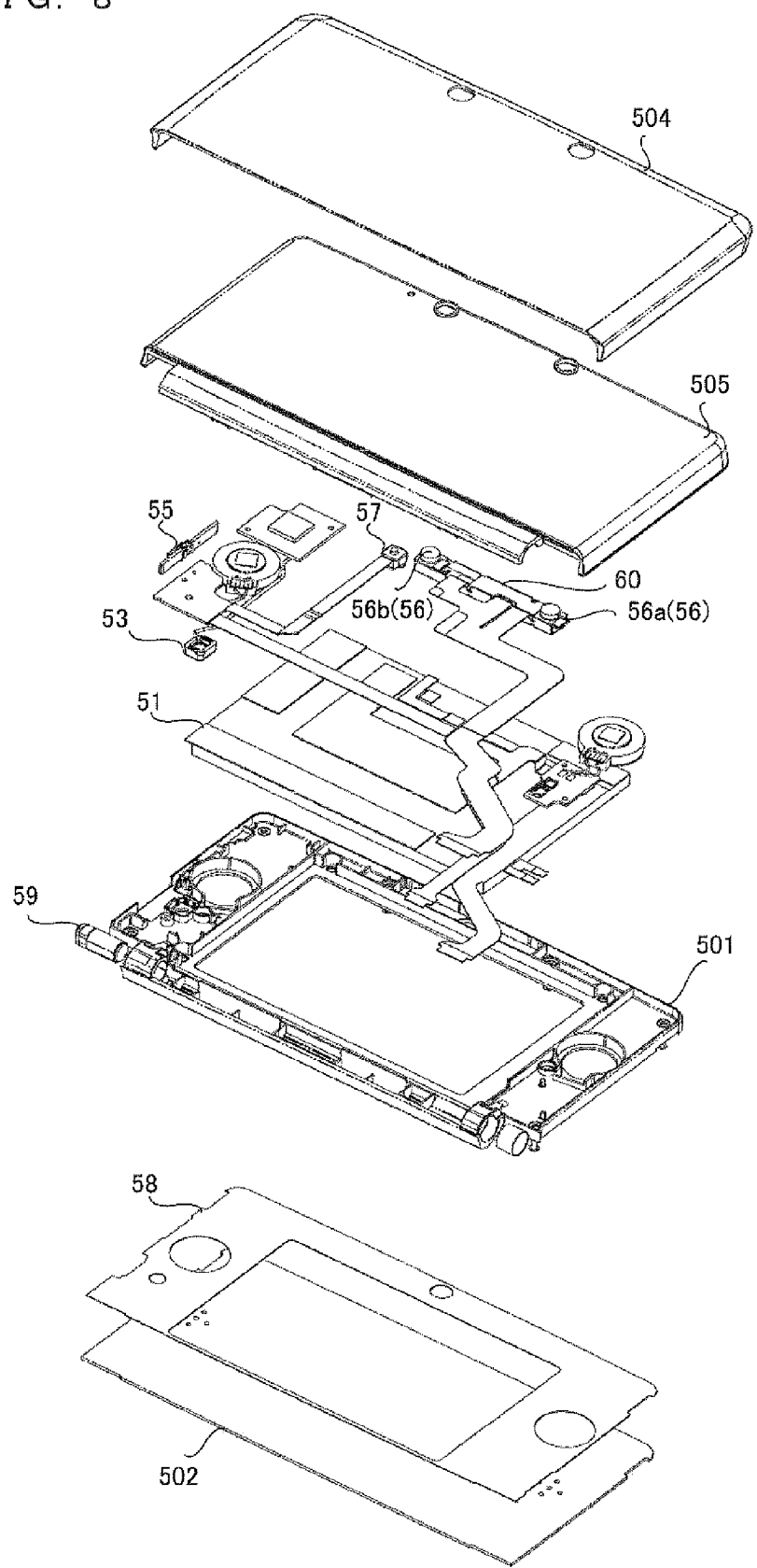
FIG. 8 shows an exploded perspective view of the upper housing 5, as viewed from the back.

Next, with reference to FIG. 6 through FIG. 8, the upper housing 5 will be described. FIG. 6A is a left side view of the upper housing 5; FIG. 6B is a front view of the upper housing 5; FIG. 6C is a right side view of the upper housing 5; FIG. 6D is a back view of the upper housing 5; FIG. 6E is a top view of the upper housing 5; and FIG. 6F is a bottom view of the. In addition, FIG. 7 is an exploded perspective view of the upper housing 5, as viewed from the front. FIG. 8 is an exploded perspective view of the upper housing 5, as viewed from the back.

As shown in FIG. 6 through FIG. 8, a first part 501, a second part 502, and a third part 503 constitute the upper housing 5. A third A part 504 and a third B part 505 further constitute the third part 503. Each of the first part 501, the second part 502, the third A part 504, and the third B part 505 is integrally molded. The third part 503 may be integrally molded. The first part 501 is a part integrally formed by the substantially rectangular third component 501A (refer to FIG. 12B) arranged inside the upper housing 5 (in other words, the third component 501A is housed in the third part 503 and covered by the second part 502) and a protrusion part 501B constituting a part (front surface side portion) of the first connecting part 7 of the upper housing 5. In addition, the second part 502 is a member which has a transparent region constituting a front surface of the upper housing 5, is flat-plate-like, and is integrally molded. In addition, the third part 503 includes a back surface, right and left side surfaces, a top surface, and a bottom surface of the upper housing 5 and also includes a part (back surface side portion) of the first connecting part 7 of the upper housing 5. Details of these parts (501, 502, 504, and 505) constituting the upper housing 5 will be described later.

As shown in FIG. 6 through FIG. 8, housed in the upper housing 5 are the upper side LCD (Liquid Crystal. Display) 51, an inside image pickup part 52, a 3D LED 53, the loudspeakers 54, a parallax amount adjustment switch 55, and an outside image pickup part 56 (56a and 56b). A screen of the upper side LCD 51, the inside image pickup part 52, and the 3D LED 53 are provided in an inner surface (inner surface of the first component 6) of the upper housing 5. In addition, in the inner surface (inner surface of the first component 6) of the upper housing 5, a plurality of sound holes 502A of the loudspeakers for outputting sound from the loudspeakers 54 (FIG. 7) are provided on a right side and a left side beside the upper side LCD 51. In addition, in a right side surface of the upper housing 5, the parallax amount adjustment switch 55 is provided (FIG. 6B and FIG. 6C). The parallax amount adjustment switch 55 is provided in edge portions of the inner surface and the right side surface of the upper housing 5, and a key top thereof is exposed toward the inner surface. In the open state, the parallax amount adjustment switch 55 is arranged such that with the upper housing 5 viewed from the front, the key top of the parallax amount adjustment switch 55 is visible. This makes an operation state of the parallax amount adjustment switch 55 be visible as viewed from the front. In addition, an operation part of the parallax amount adjustment switch 55 is exposed in a right side surface direction of the upper housing 5 and is visible and operable from the right side surface. In addition, in a back surface of the upper housing 5, the outside image pickup part 56 (56a and 56b) and an LED 57 for the outside image pickup part are provided.

As described above, the second part 502 which is the flat-plate-like member formed of a transparent resin constitutes the front surface (inner surface) of the upper housing 5. Since in FIG. 1B, the second part 502 which is transparent in reality is shown as not being transparent, the upper side LCD 51, the inside image pickup part 52, and the 3D LED 53 are not shown (indicated by the broken line in FIG. 1B). On the other hand, in FIG. 6B, since the second part 502 is shown as being transparent, the upper side LCD 51, the inside image pickup part 52, and the 3D LED 53 are shown. Similarly, the third A part 504 formed of a transparent resin constitutes the back surface of the upper housing 5. In FIG. 1D, since the third A part 504 which is transparent in reality is shown as not being transparent, the LED 57 for the outside image pickup part is not shown (indicated by the broken line in FIG. 1D). In FIG. 6D, since the third A part 504 is shown as being transparent, the LED 57 for the outside image pickup part is shown.

Hereinafter, the above-mentioned parts 51 through 57 housed in the upper housing 5 will be described.

The upper side LCD 51 is of a horizontally-long shape and is arranged such that a long-side direction thereof coincides with a long-side direction of the upper housing 5. The upper side LCD 51 is arranged in a central portion of the upper housing 5. An area of a screen of the upper side LCD 51 is set to be larger than that of the screen of the lower side LCD 21. The upper side LCD 51 is a display device which has a predetermined resolution. In the present embodiment, the upper side LCD 51 is a liquid crystal display. However, for example, a display device utilizing EL (Electro Luminescence) or the like may be used.

Specifically, the upper side LCD 51 is a display device capable of displaying an image which can be viewed stereoscopically by the naked eyes, and as the upper side LCD 51, a lenticular system or a parallax barrier system is used. In the present embodiment, as the upper side LCD 51, the parallax barrier system is used. The upper side LCD 51 displays an image (three-dimensional image) which can be stereoscopically viewed by the naked eyes, using images for a right eye and images for a left eye. In other words, the upper side LCD 51 displays each of the images for a right eye and each of the images for a left eye so as to be placed side by side in an alternate manner per predetermined unit and causes the images for a right eye to be viewed by a user's right eye and the images for a left eye to be viewed by a user's left eye by using the parallax barrier, thereby allowing a three-dimensional image (stereoscopically viewable image) giving a user a stereoscopic vision to be displayed. In addition, the upper side LCD 51 is capable of disabling the above-mentioned parallax barrier and of displaying an image in a two-dimensional manner when the parallax barrier is disabled (capable of displaying a two-dimensionally viewable image which is opposite to the above-described three-dimensionally viewable image in the meaning). As described above, the upper side LCD 51 is a display device which is capable of switching between a three-dimensional display mode in which a stereoscopically viewable image is displayed and a two-dimensional display mode in which an image is displayed in a planar manner (a two-dimensionally viewable image is displayed). This switching between the display modes is performed by the parallax amount adjustment switch 55.

The inside image pickup part 52 is arranged at an upper portion (more specifically, above the upper side LCD 51) of the inner surface of the upper housing 5, which is located in a central position with respect to a right and left direction of the upper housing 5. The inside image pickup part 52 is an image pickup device which shoots an image in an inner surface direction (inward normal direction) of the upper housing 5. The inside image pickup part 52 includes an imaging element (for example, a CCD image sensor, a CMOS image sensor, etc.) having a predetermined resolution and including a lens. The lens may have a zoom mechanism.

The 3D LED 53 is provided on a right side beside the upper side LCD 51 and indicates whether or not a display mode of the upper side LCD 51 is the three-dimensional display mode. When the display mode of the upper side LCD 51 is the three-dimensional display mode, the 3D LED 53 is lit up. The 3D LED 53 may be lit up when the upper side LCD 51 displays the three-dimensionally viewable image and may be lit up when the three-dimensionally viewable image can be displayed (in a state where the three-dimensionally viewable image can be displayed even when the parallax amount adjustment switch 55 turns off the three-dimensional display mode and the two-dimensionally viewable image is displayed). In addition, the loudspeakers 54 are arranged on right and left sides of the upper side LCD 51, outputting sound.

The parallax amount adjustment switch 55 has an operation part, which can be slid in an up-and-down direction, and is used for switching between the display modes of the upper side LCD 51 as described above. When the operation part of the parallax amount adjustment switch 55 is slid so as to be positioned at the lowest point, the display mode of the upper side LCD 51 is switched to the two-dimensional display mode (the three-dimensional display is turned off). In addition, the parallax amount adjustment switch 55 is also used for adjusting the way in which a three-dimensional image displayed on the upper side LCD 51 is viewed. For example, when the game apparatus 1 displays on the upper side LCD 51 a view of a three-dimensional virtual space, which is shot by a virtual stereo camera, a distance between imaging elements of the virtual stereo camera is adjusted in accordance with a position of the operation part of the parallax amount adjustment switch 55. By adjusting the parallax amount adjustment switch 55, a user can adjust the way in which a three-dimensional image displayed on the upper side LCD 51 is viewed.

The outside image pickup part 56 is provided on the back surface of the upper housing 5 and is a stereo camera which shoots a back surface direction (an outward normal direction of the back surface). Specifically, two image pickup devices which are an outside image pickup part (left) 56a and an outside image pickup part (right) 56b constitute the outside image pickup part 56. An imaging direction of each of the outside image pickup part (left) 56a and the outside image pickup part (right) 56b is an outward normal direction of the back surface of the upper housing 5. In addition, each of these image pickup parts is designed so as to be located in a direction which is opposite to a normal direction of the screen of the upper side LCD 51 by 180 degrees. In other words, an imaging direction of the outside image pickup part (left) 56a and an imaging direction of the outside image pickup part (right) 56b are in parallel with each other. By a program executed by the game apparatus 1, it is also made possible to use the outside image pickup part 56 as a non-stereo camera by singly using either one of the two outside image pickup parts (56a and 56b). In addition, depending on a program, it is also made possible to perform imaging, whose imaging range is expanded, by synthesizing or using in a complementary manner images shot by the two outside image pickup part (56a and 56b). Each of the outside image pickup part (left) 56a and the outside image pickup part (right) 56b includes an imaging element (for example, a CCD image sensor, a CMOS image sensor, etc.) having a predetermined common resolution and a lens. The lens may have a zoom mechanism. The outside image pickup part 56 is provided on an upper portion of the back surface of the upper housing 5, and the right and left image pickup parts are provided at positions which are symmetrical with respect to the right and left direction of the upper housing 5. More specifically, at a position on a back side of the midpoint position between the outside image pickup part (left) 56a and the outside image pickup part (right) 56b, the above-mentioned inside image pickup part 52 is arranged. As shown in FIG. 7 and FIG. 8, the outside image pickup part 56 and the inside image pickup part 52 are integrally assembled as an image pickup unit 60 and housed inside the upper housing 5.

The LED 57 for the outside image pickup part is provided in the back surface of the upper housing 5. Specifically, the LED 57 for the outside image pickup part is provided in an upper portion of the back surface of the upper housing 5 and in the vicinity of the outside image pickup part (right) 56b (on a left side beside the outside image pickup part (right) 56b in a case where the back surface of the upper housing 5 is viewed from the front). The LED 57 for the outside image pickup part indicates whether or not shooting images by the outside image pickup part 56 is possible, and specifically, when shooting images by the outside image pickup part 56 is possible, the LED 57 for the outside image pickup part is lit up.

(Details of Parts Constituting Housings)

Next, details of the parts constituting the lower housing 2 and the upper housing 5 will be described. First, with reference to FIG. 9 through FIG. 11, details of the parts (the fourth part 202, the fifth part 201, and the sixth part 203) constituting the lower housing 2 will be described.

(Details of Parts Constituting Lower Housing 2)

FIG. 9A is a left side view of the fifth part 201 constituting the lower housing 2; FIG. 9B is a front view of the fifth part 201 constituting the lower housing 2; FIG. 9C is a right side view of the fifth part 201 constituting the lower housing 2; FIG. 9D is a back view of the fifth part 201 constituting the lower housing 2; FIG. 9E is a top view of the fifth part 201 constituting the lower housing 2; and FIG. 9F is a bottom view of the fifth part 201 constituting the lower housing 2.

(Description of Fifth Part)

The fifth part 201 is a part which the front surface (the inner surface; the inner surface of the second component 3) of the lower housing 2, the second connecting part 4, the front surface side portion of the right side surface of the lower housing 2, the front surface side portion of the left side surface thereof, the front surface side portion of the top surface thereof, and the front surface side portion of the bottom surface thereof constitute. In a central portion of the front surface (the inner surface of the lower housing 2) of the fifth part 201, an opening 201A is formed, the screen of the lower side LCD 21 is exposed from the opening 201A. On a left side beside the opening 201A, a cross-shaped opening 201B is formed, and on a side above the opening 201B, a circular opening 201C is formed. In other words, the opening 201C is provided in an upper region of a left side region beside the opening 201A, and the opening 201B is provided in a lower region of the left side region beside the opening 201A. In addition, the opening 201C and the opening 201B are arranged in positions which a thumb of a left hand reaches when a user holds the lower housing 2. A key top of the cross key 23 is exposed from the opening 201B and a key top of the analog key 25 is exposed from the opening 201C. The opening 201C is formed in a recess 201D, which has a radius larger than that of the opening 201C and is of a shape of a circle which is concentric with a circle of a shape of the opening 201C. The opening 201C from which the key top of the analog key 25 is exposed is formed in the recess 201D, whereby it is prevented that when the lower housing 2 and the upper housing 5 are folded, the key top of the analog key 25 comes in contact with the upper housing 5 and the lower housing 2 and the upper housing 5 thereby cannot be folded. In addition, in an upper region of a right side region beside the opening 201A, four openings 201E are formed in a cross-like manner, and key tops of the operation buttons 24A, 24B, 24C, and 24D are exposed from these openings 201E. In addition, in a lower portion of a right side beside the opening 201A, an opening 201F for exposing the power button 26 is formed. In addition, on a side below the opening 201A, three openings 201G for exposing the select button 27A, the HOME button 27B, and the start button 27C are formed so as to be arranged in a horizontal direction. The openings 201G for these buttons 27A, 27B, and 27C are formed inside a sheet key top mounting part 201H for mounting a sheet-like key top (sheet 27a). The opening 201A from which the screen of the lower side LCD 21 is exposed and the sheet key top mounting part 201H are formed inside a rectangular region 201I which is arranged in a central portion of the front surface of the fifth part 201. The rectangular region 201I is a rectangular region which is enclosed with an upper edge of the opening 201A, a right edge of the opening 201A, a right edge of the sheet key top mounting part 201H, a lower edge of the sheet key top mounting part 201H, a left edge of the opening 201A, and a left edge of the sheet key top mounting part 201H. Because right and left ends and a lower end of the rectangular region 201I are protruded, when the lower housing 2 and the upper housing 5 are folded, the screen of the lower side LCD 21 and a key top (key tops of the buttons 27A, 27B, and 27C) of the sheet key do not contact the upper housing 5.

In a left side surface of the fifth part 201, an opening 201J for exposing a key top of the sound volume switch 35 is formed. In addition, in a position below the opening 201J on the left side surface of the fifth part 201, a recess 201K is formed. Specifically, in an edge portion of the left side surface of the fifth part 201 on a side (back surface side) which is opposite to a side on the front surface of the fifth part 201, the recess 201K which is of a semicircular shape is formed. The recess 201K is formed, whereby when the parts have been assembled and the lower housing 2 has been thereby formed, it is made easy for a user to pick up the cover 36a with his or her finger when a user removes the cover 36a of the SD card unit 36. In other words, the recess 201K is a dent which is provided in a portion facing the opening 202F (described later) of the fourth part 202, with the fifth part 201 and the fourth part 202 assembled, and is of a shape whose width increases toward a back surface edge.

In a right side surface of the fifth part 201, an opening 201L for exposing a key top of the wireless switch 37 and an opening 201M for exposing an LED lens of the wireless LED 28B are formed. The key top of the wireless switch 37 is protruded and exposed in a right side surface direction from the opening 201L. In addition, the LED lens of the wireless LED 28B is protruded and exposed in the right side surface direction from the opening 201M.

On a right side beside a center of a bottom surface of the fifth part 201, an opening 201N for exposing the power LED 28C and an opening 201O for exposing the charge LED 28D are formed. The LED lens of the power LED 28C is protruded and exposed in a bottom surface direction from the opening 201N. In addition, the LED lens of the charge LED 28D is protruded and exposed in a bottom surface direction from the opening 201O. In addition, in a central portion of the bottom surface of the fifth part 201, an opening 201P, which is of a semicircular shape, for exposing the earphone jack 38 is formed. By assembling the fourth part 202 and the fifth part 201, the opening 201P constitutes a circular earphone insertion slot.

On a right side of the second connecting part 4 of the fifth part 201, an opening 201Q for exposing the notification LED 28A is formed. The LED lens of the notification LED 28A is protruded and exposed in a front surface direction from the opening 201Q.

In a back surface of the fifth part 201, screw holes 201R, the number of which is n (nine), are formed, and screw holes 202C of the fourth part 202 and the screw holes 201R are fastened by screws, the number of which is n.

(Description of Fourth Part)

Next, with reference to FIG. 10, the fourth part 202 will be described. FIG. 10A is a left side view of the fourth part 202 constituting the lower housing 2; FIG. 10B is a front view of the fourth part 202 constituting the lower housing 2; FIG. 10C is a right side view of the fourth part 202 constituting the lower housing 2; FIG. 10D is a back view of the fourth part 202 constituting the lower housing 2; FIG. 10E is a top view of the fourth part 202 constituting the lower housing 2; and FIG. 10F is a bottom view of the fourth part 202 constituting the lower housing 2.

The fourth part 202 is a part which a back surface side portion of the right side surface, a back surface side portion of the left side surface, a back surface side portion of the top surface, and a back surface side portion of the bottom surface of the lower housing 2 constitute. As shown in FIG. 10D, on a back surface side of the fourth part 202, a rectangular recess 202A whose size, as viewed from the front, is greater than or equal to 70% (specifically, approximately 80%) of a size of the back surface of the lower housing 2, as viewed from the front. In other words, the recess 202A has an area of 70% or more of an area of the back surface of the lower housing 2. In the recess 202A, a battery housing part 202B which houses the battery 41 and allows the battery 41 to be taken out from a back surface direction (frontward from a plane of paper of FIG. 10D) is formed. In addition, in the recess 202A, the screw holes 202C, the number of which is n (nine), and screw holes 202D, the number of which is in (four) smaller than n, are formed. The screw holes 202C of the fourth part 202 and the screw holes 201R of the fifth part 201 are fastened by the screws, the number of which is n, whereby the fourth part 202 and the fifth part 201 are assembled. In addition, in the recess 202A, two hook slots 202E are formed. In these hook slots 202E, the later-described hooks 203B of the sixth part 203 are engaged.

in addition, on a left side surface of the fourth part 202, an opening 202F constituting an insertion slot for inserting the SD card into the SD card unit 36 is formed. The opening 202F is formed such that a front surface side thereof is open. FIG. 10G is a diagram illustrating an enlarged view of the opening 202F formed in the left side surface of the fourth part 202. As shown in FIG. 10G, the opening 202F is not a closed opening itself and a front surface end is open. When the fourth part 202 and the fifth part 201 have been assembled, the front surface end of the opening 202F of the fourth part 202 is closed by a left side surface end portion of the fifth part 201 facing the opening 202F, and a closed opening is formed, whereby the insertion slot for the SD card is formed. The opening 202F is covered by the cover 36a. The cover 36a is a lid member which is opened and closed in a back surface direction and is formed of an elastomer.

In both end portions of a top surface of the fourth part 202, an opening 202G and an opening 202H for exposing key tops of the L button 29A and the R button 29B, respectively are formed. In addition, in the top surface of the fourth part 202, openings 202I, 202J, 202K, and 202L for exposing the infra-red-ray communication module 30, the touch pen holder 31, the game card insertion slot of the game card unit 32, and the power connector 33, respectively are formed. In addition, in the top surface of the fourth part 202, an opening 202M for exposing the cradle connecting terminal 34 is formed.

In addition, in a central portion of a bottom surface of the fourth part 202, an opening 202N, which is of a semicircular shape, for exposing the earphone jack 38 is formed. By assembling the fourth part 202 and the fifth part 201, the opening 202N constitutes the circular earphone insertion slot.

(Description of Sixth Part)

Next, with reference to FIG. 11, the sixth part 203 will be described. FIG. 11A is a left side view of the sixth part 203 constituting the lower housing 2; FIG. 11B is a front view of the sixth part 203 constituting the lower housing 2; FIG. 11C is a right side view of the sixth part 203 constituting the lower housing 2; FIG. 11D is a back view of the sixth part 203 constituting the lower housing 2; FIG. 11E is a top view of the sixth part 203 constituting the lower housing 2; and FIG. 11F is a bottom view of the sixth part 203 constituting the lower housing 2.

The sixth part 203 is a flat-plate-like member constituting the back surface of the lower housing 2. The sixth part 203 is a substantially-rectangular flat plate and has a shape and size which allow the sixth part 203 to be fitted into the recess 202A formed in the back surface of the fourth part 202. The sixth part 203 is a battery lid, and a size thereof, as viewed from the front, is greatly larger than a size of the battery, as viewed from the front. Specifically, the size of the sixth part 203, as viewed from the front, is twice or more (more specifically, 2.5 times or more) as large as the size of the battery, as viewed from the front. Although as the battery lid, such a size is unnecessary, the sixth part 203 is designed so as to have the larger size than that of the battery as described above, thereby attaining the later-described effect. In the vicinity of an upper edge portion of the sixth part 203, screw holes 203A, the number of which is m (four), are formed. In addition, on a lower edge portion of the sixth part 203, two hooks 203B are formed, and the hooks 203B are engaged in the hook slots 202E of the fourth part 202. The screw holes 203A of the sixth part 203 and the screw holes 202D of the fourth part 202 are fastened by the screws, the number of which is m, whereby the fourth part 202 and the sixth part 203 are assembled.

As described above, the fourth part 202, the fifth part 201, and the sixth part 203 are assembled, whereby the lower housing 2 is formed.

(Details of Parts Constituting Upper Housing)

Next, with reference to FIG. 12 through FIG. 15, the details of the parts constituting the upper housing 5 will be described. The first part 501, the second part 502, and the third part 503 constitute the upper housing 5. The third A part 504 and the third B part 505 further constitute the third part 503.

(Description of First Part)

FIG. 12A is a left side view of the first part 501 constituting the upper housing 5; FIG. 12B is a front view of the first part 501 constituting the upper housing 5; FIG. 12C is a right side view of the first part 501 constituting the upper housing 5; FIG. 12D is a back view of the first part 501 constituting the upper housing 5; FIG. 12E is a top view of the first part 501 constituting the upper housing 5; and FIG. 12F is a bottom view of the first part 501 constituting the upper housing 5.

The first part 501 is a part integrally formed by the third component 501A (portion enclosed by a broken line) arranged inside the upper housing 5 and the protrusion part 501B constituting a part (front surface side portion) of the first connecting part 7 of the upper housing 5. The third component 501A is of a substantially-rectangular shape, as viewed from the front, and has a shape and a size which are equivalent to those of a front surface of the first component 6 of the upper housing 5. However, since the third component 501A is housed in a recess enclosed by the top surface, the both side surfaces, and the bottom surface of the third part 503 (more specifically, the third A part 504 in the present embodiment), the size of the third component 501A, as viewed from the front, is slightly smaller than the size of the front surface of the upper housing 5 (smaller by thicknesses of the top surface, the both side surfaces, and the bottom surface of the third part 503), to be accurate. In addition, the third component 501A has the same size as that of the recess enclosed by the top surface, the both side surfaces, and the bottom surface of the third part 503 (more specifically, the third A part 504 in the present embodiment). As shown in FIG. 12, the protrusion part 501B is formed so as to be protruded downward from a central portion of a lower edge of the third component 501A. The protrusion part 501B constitutes the front surface side portion of the first connecting part 7 of the upper housing 5. In both right and left end portions of the protrusion part 501B, cylindrical parts are formed, and the hinge pin 59 is inserted into the cylindrical parts, whereby the hinge pin 59 is supported (refer to FIG. 8). Since in the side views shown in FIG. 12A and FIG. 12C, the cylindrical parts are shown, the protrusion part 501B seems to constitute also the back surface side portion of the first connecting part 7. In reality, however, the protrusion part 501B does not constitute the back surface side portion of the first connecting part 7 (only the both ends (cylindrical parts) constitutes a part of the back surface side portion of the first connecting part 7), but constitutes the front surface side portion of the first connecting part 7.

In a central portion of the front surface of the third component 501A of the first part 501, an upper side LCD opening 501C for exposing the screen of the upper side LCD 51 is provided. In a portion above the opening 501C, an inside image pickup part opening 501D for exposing the inside image pickup part 52 is provided. In addition, on a right side and a left side beside the upper side LCD opening 501C, loudspeaker openings 501E and 501F for exposing the loudspeakers 54 are provided. In addition, on the right side (below the opening 501F for the loudspeaker) beside the upper side LCD opening 501C, a 3D LED opening 501G for exposing the LED lens of the 3D LED 53 is provided.

In addition, in a right side surface of the first part 501, an opening 501H for exposing the operation part of the parallax amount adjustment switch 55 in a side surface direction (a normal direction of the right side surface) is provided. In addition, in the third component 501A of the first part 501, a plurality of screw holes 501I are provided. The first part 501 is connected with the third B part 505 by screws.

(Description of Second Part)

Next, the second part 502 will be described. FIG. 13A is a left side view of the second part 502 constituting the upper housing 5; FIG. 13B is a front view of the second part 502 constituting the upper housing 5; FIG. 13C is a right side view of the second part 502 constituting the upper housing 5; FIG. 13D is a back view of the second part 502 constituting the upper housing 5; FIG. 13E is a top view of the second part 502 constituting the upper housing 5; and FIG. 13F is a bottom view of the second part 502 constituting the upper housing 5. FIG. 13G is a front view in a case where the second part 502 has been subjected to printing.

The second part 502 is a flat-plate-like part which is formed of a transparent resin and constitutes the front surface of the upper housing 5. The second part 502 has a shape and a size, which allow the whole of the third component 501A of the first part 501 to be covered, is formed so as to have the substantially same shape and size as those of the third component 501A of the first part 501, and is bonded to the third component 501A of the first part 501. Thus, the second part 502 constitutes the front surface (inner surface) of the upper housing 5. In addition, the second part 502 has a shape and a size which are equivalent to those of the front surface of the first component 6 of the upper housing 5 (to be accurate, however, the size thereof is smaller by the thicknesses of the top surface, the both side surfaces, and the bottom surface of the third part 503, as described above).

On a right side and a left side of the second part 502, the sound holes 502A for the loudspeakers 54 are provided. Specifically, the sound holes 502A are provided in portions corresponding to positions of the loudspeaker opening 501E and the loudspeaker opening 501F of the first part 501, respectively. The first part 501 and the second part 502 are bonded by an bonding sheet 58 in a region which excludes a region corresponding to the upper side LCD opening 501C, provided in the first part 501; a region corresponding to the inside image pickup part opening 501D, provided therein; and a region corresponding to the opening 501G for the 3D LED 53, provided therein (refer to FIG. 7).

In addition, though the second part 502 is originally the transparent member, a region thereof other than the region corresponding to the upper side LCD opening 501C and other than the region corresponding to the inside image pickup part opening 501D is subjected to screen printing (silk-screen printing) or the like such that at least the region corresponding to the upper side LCD opening 501C and the region corresponding to the inside image pickup part opening 501D become transparent, the printing conducted from a back surface (a surface bonded to the first part 501). In addition, in a region corresponding to the opening 501G for the 3D LED 53 of the first part 501, characters which are inscribed so as to appear transparent are printed from the back surface. Specifically, as shown in FIG. 13G, the region thereof other than the region corresponding to the upper side LCD opening 501C and other than the region corresponding to the inside image pickup part opening 501D is subjected to printing (painting) using a predetermined color. In addition, in the region corresponding to the opening 501G for the 3D LED 53, characters inscribed so as to appear transparent (characters formed by printing only a background with a predetermined color) are printed such that predetermined characters (for example, "3D") are displayed when the 3D LED 53 emits light. In addition, in the vicinity of a right edge portion of the second part 502, characters (for example, "OFF") inscribed so as to appear transparent, which indicates that the three-dimensional display of the upper side LCD 51 is turned off, are printed at a position of the lowest point of the parallax amount adjustment switch 55. The printing of these characters is conducted at the same time in the same process.

Thus, the portions corresponding to the upper side LCD 51 and the inside image pickup part 52 become transparent, are thereby made visible from the front surface, and serve as covers for the upper side LCD 51 and the inside image pickup part 52. In addition, the characters are displayed when the 3D LED 53 emits light whereas a back side of the region other than these portions become invisible. Accordingly, when the first part 501 and the second part 502 are assembled, the screws and the like provided in the third component 501A of the first part 501 can be concealed.

(Description of Third Part)

Next, the third part 503 will be described. As described above, the outside third A part 504 and the inside third B part 505 constitute the third part 503. In other words, the third A part 504 is a part which becomes a surface of the back surface side when assembled, and the third B part 505 is a part which is present in a layer below the third A part 504. FIG. 14A is a left side view of the third A part 504 constituting the upper housing 5; FIG. 14B is a front view of the third A part 504 constituting the upper housing 5; FIG. 14C is a right side view of the third A part 504 constituting the upper housing 5; FIG. 14D is a back view of the third A part 504 constituting the upper housing 5; FIG. 14E is a top view of the third A part 504 constituting the upper housing 5; and FIG. 14F is a bottom view of the third A part 504 constituting the upper housing 5. In addition, FIG. 15A is a left side view of the third B part 505 constituting the upper housing 5; FIG. 15B is a front view of the third. B part 505 constituting the upper housing 5; FIG. 15C is a right side view of the third B part 505 constituting the upper housing 5; FIG. 15D is a back view of the third B part 505 constituting the upper housing 5; FIG. 15E is a top view of the third B part 505 constituting the upper housing 5; and FIG. 15F is a bottom view of the third B part 505 constituting the upper housing 5.

The third part 503 is a part which the back surface, the left side surface, the right side surface, and the top surface of the upper housing 5 as well as a part (back surface side portion) of the first connecting part 7 constitute. In the third part 503, a recess is formed by the back surface, the left side surface, the right side surface, and the top surface of the third part 503. In the recess of the third part 503, the third component 501A of the first part 501 and the second part 502 are housed with the one on top of the other. In other words, horizontal and vertical dimensions of the third part 503, with the recess of the third part 503 viewed from the front surface, are designed so as to be the substantially same as those of each of the third component 501A of the first part 501 and the second part 502, as viewed from the front. In the recess of the third part 503, the third component 501A of the first part 501 and the second part 502 are housed with the one on top of the other, whereby the upper housing 5 is formed.

As shown in FIG. 14, the third A part 504 has: a back surface part 504A constituting the back surface of the upper housing 5; a top surface part 504B constituting the top surface of the upper housing 5; a left side surface 504C constituting the left side surface of the upper housing 5; and a right side surface 504D constituting the right side surface of the upper housing 5. A lower edge of the third A part 504 is open. In addition, in the back surface part 504A of the third A part 504, an opening 504E for exposing the outside image pickup part (left) 56a and an opening 504F for exposing the outside image pickup part (right) 56b are provided. In addition, in a front surface side edge portion of the right side surface of the third A part 504, an opening 504G for exposing the parallax amount adjustment switch 55 in a right side surface direction and a front surface direction. The third A part 504 is formed of a transparent resin.

In addition, as shown in FIG. 15, the third B part 505 has: a back surface part 505A; a top surface part 505B; a left side surface part 505C; a right side surface part 505D; a bottom surface part 505J; and a protrusion part 505H protruding downward from a lower edge of the back surface part 505A. The protrusion part 505H constitutes a back surface side portion of the first connecting part 7 of the upper housing 5. In other words, when the third B part 505 and the first part 501 are assembled, the first connecting part 7 of the upper housing 5 is formed by the protrusion part 505H of the third B part 505 and the protrusion part 501B of the first part 501. In addition, the recess of the third part 503 is formed by the back surface part 505A, the top surface part 505B, the left side surface part 505C, the right side surface part 505D, and the bottom surface part 505J of the third B part 505. In the recess, the third component 501A of the first part 501 and the second part 502 are housed with the one on top of the other. In addition, in the back surface part 505A of the third B part 505, an opening 505E for exposing the outside image pickup part (left) 56a and an opening 505F for exposing the outside image pickup part (right) 56b are provided. In addition, in the right side surface part 505D of the third B part 505, an opening 505G for exposing the parallax amount adjustment switch 55 in a right side surface direction and a front surface direction. In addition, in the back surface part 505A of the third B part 505, an opening 505I for exposing the LED 57 for the outside image pickup part is formed.

In the recess formed by the back surface part 504A, the top surface part 504B, the left side surface 504C, and the right side surface 504D of the third A part 504, the third B part 505 is engaged. The third A part 504 and the third B part 505 are bonded with a double-sided adhesive tape or the like. Thus, the third part 503 is formed. When the third A part 504 and the third B part 505 are bonded, the opening 504E of the third A part 504 and the opening 505E of the third B part 505 coincide with each other; and the opening 504F of the third A part 504 and the opening 505F of the third B part 505 coincide with each other. Thus, the outside image pickup part (left) 56a and the outside image pickup part (right) 56b are exposed in a back surface direction of the upper housing 5. In addition, when the third A part 504 and the third B part 505 are bonded, the opening 504G of the third A part 504 and the opening 505G of the third B part 505 coincide with each other. Thus, the parallax amount adjustment switch 55 is exposed in a right side surface direction and a front surface direction. In addition, since the third A part 504 is formed of the transparent resin, even when the third A part 504 is bonded on an outer side (back surface side) of the third B part 505, light of the LED 57 for the outside image pickup part is not blocked. The third part 503 may be formed by integrally forming the third A part 504 and the third B part 505.

As described above, the first part 501, the second part 502, the third A part 504, and the third B part 505 are assembled, whereby the upper housing 5 is formed.

(Relationship Among Parts)

Next, a relationship of sizes of the parts will be described. First, a size of the fifth part 201 and the third part 503 will be described.

Figure 16A:
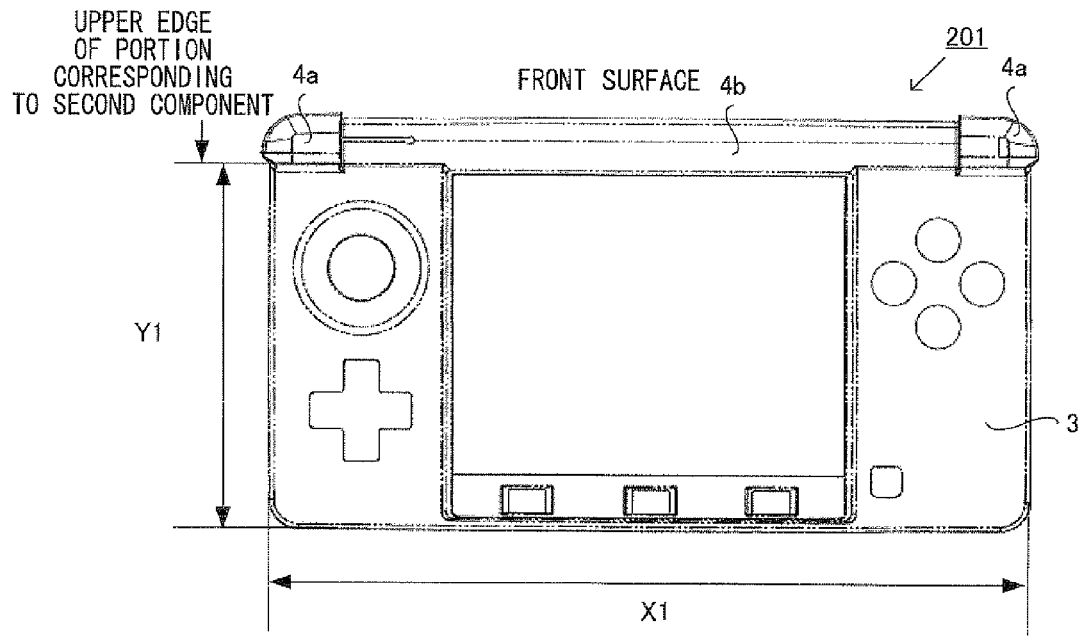
FIG. 16A is a front view of the fifth part 201, showing horizontal and vertical dimensions, on a front surface side, of a portion corresponding to the second component 3 of the fifth part 201.
Figure 16B:
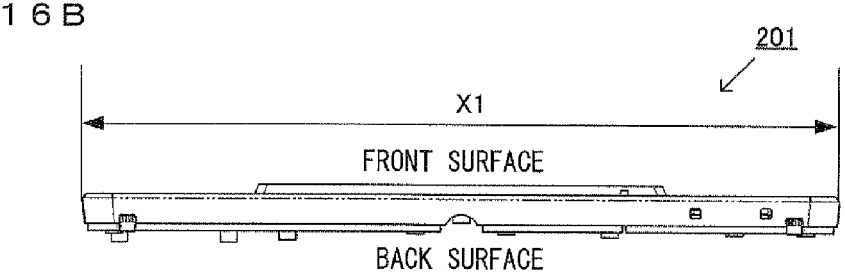
FIG. 16B is a bottom view of the fifth part 201, showing a horizontal dimension, on the front surface side, of the portion corresponding to the second component 3 of the fifth part 201.
Figure 16C:
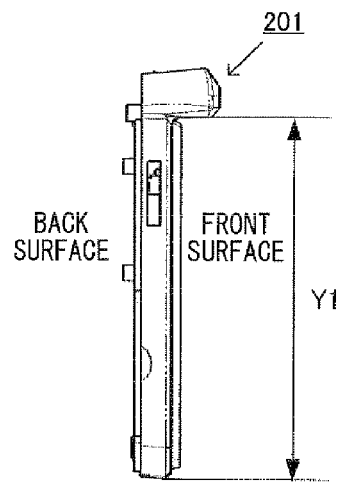
FIG. 16C is a left side view of the fifth part 201, showing a vertical dimension, on the front surface side, of the portion corresponding to the second component 3 of the fifth part 201.

FIG. 16A is a front view of the fifth part 201, showing horizontal and vertical dimensions, on a front surface side, of a portion corresponding to the second component 3 of the fifth part 201. FIG. 16B is a bottom view of the fifth part 201, showing a horizontal dimension, on the front surface side, of the portion corresponding to the second component 3 of the fifth part 201. FIG. 16C is a left side view of the fifth part 201, showing a vertical dimension, on the front surface side, of the portion corresponding to the second component 3 of the fifth part 201. In FIG. 16B, to facilitate the description, a portion corresponding to the second connecting part 4 of the fifth part 201 is omitted.

As shown in FIGS. 16A, 16B, and 16C, the horizontal dimension of an outer edge of a front surface side edge portion of a portion corresponding to the second component 3 of the fifth part 201 is set to be X1 (mm). The portion corresponding to the second component 3 of the fifth part 201 is substantially-rectangular-shaped as shown in FIG. 16A and is a part excluding the second connecting part 4 (4a and 4b) of the fifth part 201. In addition, the vertical dimension of an outer edge of a front surface side edge portion of the portion corresponding to the second component 3 of the fifth part 201 set to be Y1 (mm). Here, the X1 is a distance (distance viewed the front surface), as viewed from the front, between an edge portion where the right side surface and the front surface of the fifth part 201 intersect and an edge portion where the left side surface and the front surface of the fifth part 201 intersect. In addition, the Y1 is a distance, as viewed from the front, between an edge portion where the bottom surface and the front surface of the fifth part 201 intersect and an upper edge of the portion corresponding to the second component 3 which is the front surface of the fifth part 201.

Figure 17A:
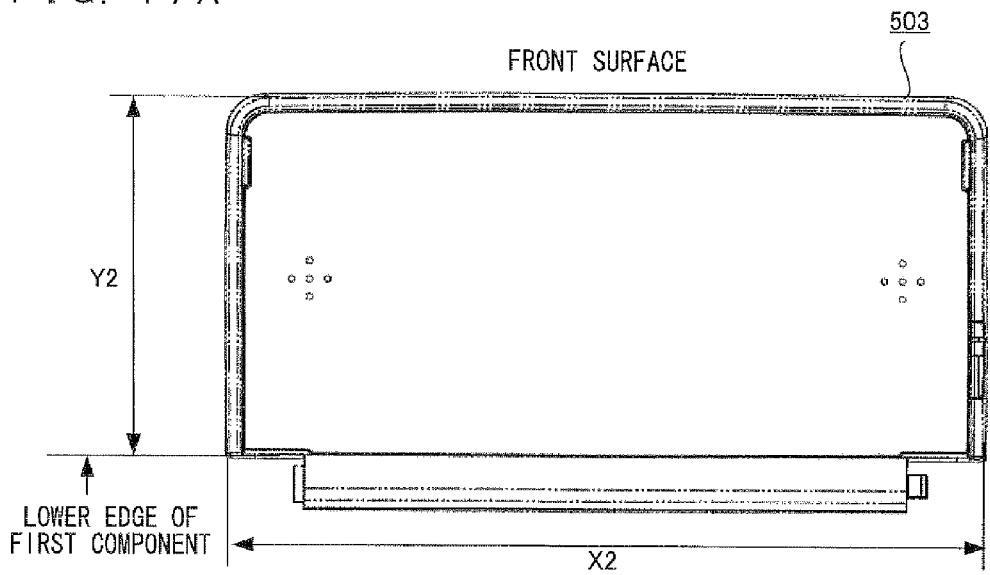
FIG. 17A is a front view of the upper housing 5, showing horizontal and vertical dimensions of a portion corresponding to the first component 6 of the third part 503.
Figure 17B:
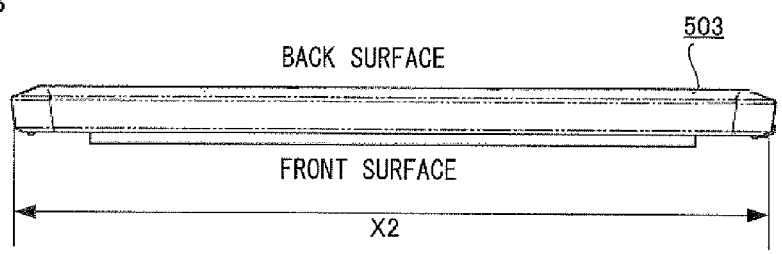
FIG. 17B is a top view of the upper housing 5, showing a horizontal dimension of the portion corresponding to the first component 6 of the third part 503.
Figure 17C:
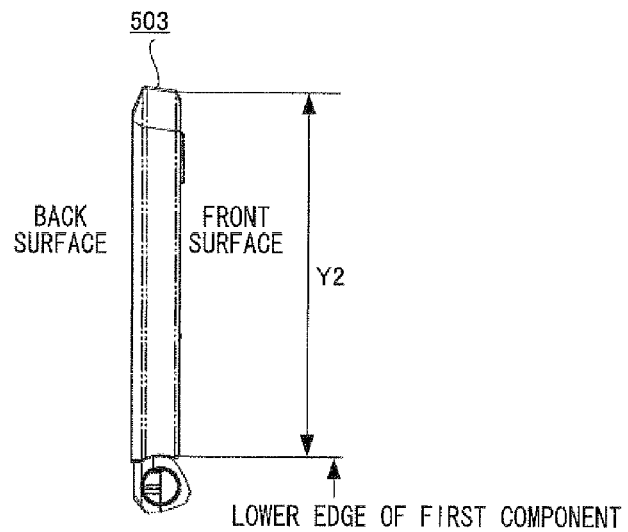
FIG. 17C is a left side view of the upper housing 5, showing a vertical dimension of the portion corresponding to the first component 6 of the third part 503.

On the other hand, a size of the third part 503 will be described. FIG. 17A is a front view of the upper housing 5, showing horizontal and vertical dimensions of a portion corresponding to the first component 6 of the third part 503. FIG. 17B is a top view of the upper housing 5, showing a horizontal dimension of the portion corresponding to the first component 6 of the third part 503. FIG. 17C is a left side view of the upper housing 5, showing a vertical dimension of the portion corresponding to the first component 6 of the third part 503.

As shown in FIGS. 17A, 17B, and 17C, the horizontal dimension of an outer edge of a front surface side edge portion of the portion corresponding to the first component 6 of the third part 503 is set to be X2 (mm). In addition, the vertical dimension of an outer edge of a front surface side edge portion of the portion corresponding to the first component 6 of the third part 503 is set to be Y2 (mm) Here, the X2 is a distance, as viewed from the front, between the front surface side edge of the right side surface of the third part 503 and the front surface side edge of the left side surface of the third part 503. In addition, the Y2 is a distance, as viewed from the front, between the front surface side edge of the top surface of the third part 503 and the front surface side edge of each of the lower edges of the first component 6.

Here, the third part 503 is a part which the back surface, the left side surface, the right side surface, and the top surface of the upper housing 5 as well as a back surface side portion of the first connecting part 7 constitute. The substantially rectangular first component 6 and the first connecting part 7 constitute the upper housing 5. The portion corresponding to the first component 6 of the third part 503 is a part of the third part 503, which correspond to the first component 6 of the upper housing 5, that is, a substantially-rectangular-shaped part. In other words, the portion corresponding to the first component 6 of the third part 503 is a part of the third part 503, which excludes the back surface side portion of the first connecting part 7.

In addition, as described above, on the front surface side of the third part 503, the recess is formed by the surfaces of the third part 503, and in the recess, the first part 501 and the second part 502 are housed. When in the recess of the third part 503, the first part 501 and the second part 502 are housed, the upper housing 5 is formed. In other words, the outer edge of the front surface side edge portion (front surface edge) of the part (that is, the substantially rectangular part) corresponding to the first component 6 of the third part 503 coincides with the outer edge of the front surface edge portion of the first component 6 (substantially-rectangular-shaped portion) of the upper housing 5. Accordingly, in FIG. 17, the horizontal and vertical dimensions of the outer edges of the front surface edge portions of the first component 6 of the upper housing 5 are shown, and these dimensions show the horizontal and vertical dimensions of the outer edges of the front surface edge portions of the portion corresponding to the first component 6 of the third part 503.

When the upper housing 5 and the lower housing 2 are connected and folded, an upper edge (a lower edge of the first component in the open state, shown in FIG. 17A) of the first component 6 of the upper housing 5 coincides with an upper edge (an upper edge of the portion corresponding to the second component in the open state, shown in FIG. 16A) of the second component of the lower housing 2.

In addition, in FIG. 16B, the horizontal dimension X1 of the front surface edge of the bottom surface of the fifth part 201 is shown, and the horizontal dimension of the front surface edge of the second component 3 of the fifth part 201 is X1 all over the fifth part 201. In other words, since the both side surfaces of the fifth part 201 extend so as to be perpendicular to the bottom surface (extend so as to be perpendicular to a plane of paper of FIG. 16B), in the second component 3, the horizontal dimension between the front surface edges is the X1 in every distance between the side surfaces of the fifth part 201. Similarly, since the bottom surface of the fifth part 201 extends so as to be perpendicular to the both side surfaces (extends so as to be perpendicular to a plane of paper of FIG. 16C), the vertical dimension between the front surface edges is the Y1 in every distance all over the bottom surface of the fifth part 201. Furthermore, similarly, in FIG. 17B, a horizontal dimension X2 of the front surface edge of the top surface of the third part 503 is shown. Since the both side surfaces of the third part 503 extend so as to be perpendicular to the top surface (extend so as to be perpendicular to a plane of paper of FIG. 17B), in the first component 6, the horizontal dimension between the front surface edges is the X2 in every distance between the side surfaces of the third part 503. Similarly, since the top surface of the third part 503 extend so as to be perpendicular to the both side surfaces (extend so as to be perpendicular to a plane of paper of FIG. 17C), the vertical dimension between the front surface edges is the Y2 in every distance all over the top surface of the third part 503.

Here, the X2 is set to be larger than the X1, and the Y2 is set to be larger than the Y1. In other words, the horizontal dimension X1 of the outer edge of the front surface side edge portion of the portion corresponding to the second component 3 of the fifth part 201 is set to be smaller than the horizontal dimension X2 of the outer edge of the front surface side edge portion of the portion corresponding to the first component 6 of the third part 503. In addition, the vertical dimension Y1 of the outer edge of the front surface side edge portion of the portion corresponding to the second component 3 of the fifth part 201 is set to be smaller than the vertical dimension Y2 of the outer edge of the front surface side edge portion of the portion corresponding to the first component 6 of the third part 503.

Figure 18A:
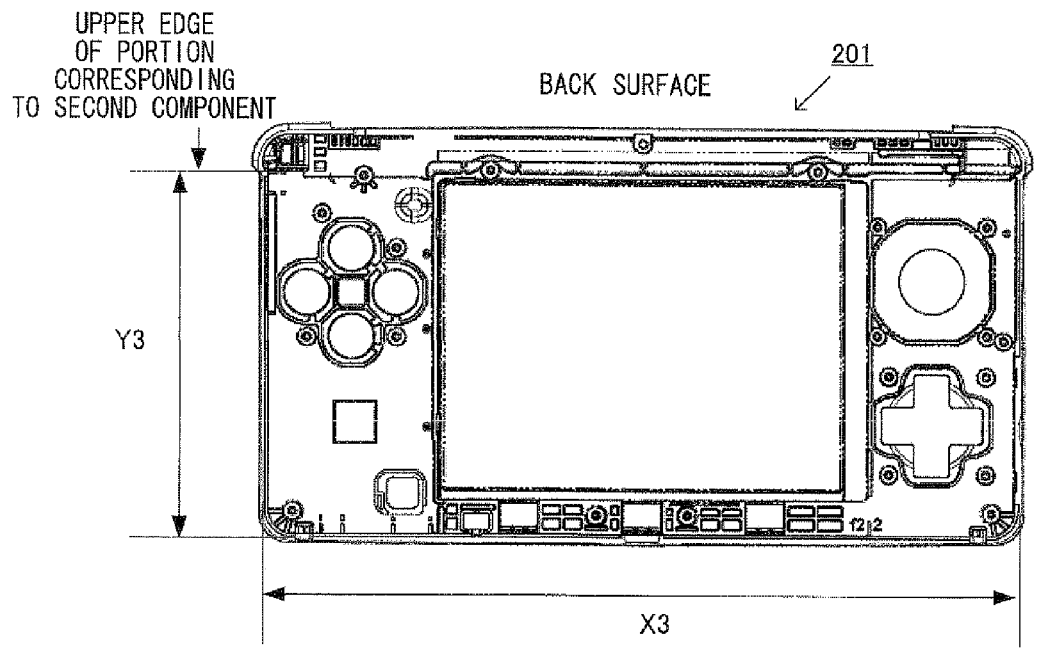
FIG. 18A is a back view of the fifth part 201, showing horizontal and vertical dimensions of a back surface side of a portion corresponding to the second component 3 of the fifth part 201.
Figure 18B:
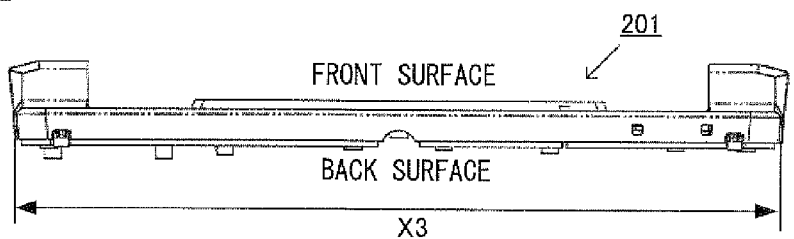
FIG. 18B is a bottom view of the fifth part 201, showing a horizontal dimension of the portion corresponding to the second component 3 of the fifth part 201.
Figure 18C:
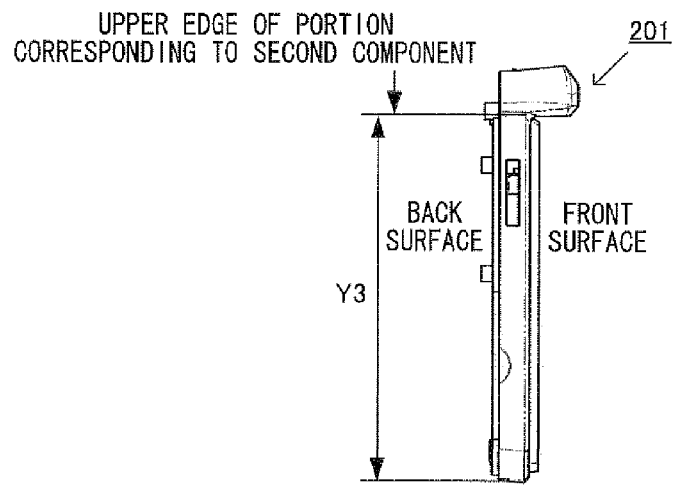
FIG. 18C is a left side view of the fifth part 201, showing a vertical dimension of the back surface side of the portion corresponding to the second component 3 of the fifth part 201.

Next, sizes of the fifth part 201 and the fourth part 202 will be described. FIG. 18A is a back view of the fifth part 201, showing horizontal and vertical dimensions of a back surface side of a portion corresponding to the second component 3 of the fifth part 201. FIG. 18B is a bottom view of the fifth part 201, showing a horizontal dimension of the portion corresponding to the second component 3 of the fifth part 201. FIG. 18C is a left side view of the fifth part 201, showing a vertical dimension of the back surface side of the portion corresponding to the second component 3 of the fifth part 201.

As shown in FIGS. 18A, 18B, and 18C, the horizontal dimension of an outer edge of a back surface side edge portion of the portion corresponding to the second component 3 of the fifth part 201 is set to be X3 (mm). In addition, the vertical dimension of the outer edge of the back surface side portion of the portion corresponding to the second component 3 of the fifth part 201 is set to be Y3 (mm). Here, the X3 is a distance, as viewed from the front, between an edge of the back surface side portion of the left side surface of the fifth part 201 and an edge of the back surface side portion of the right side surface of the fifth part 201. In addition, the Y3 is a distance, as viewed from the front, between an edge of the back surface side edge portion of the bottom surface of the fifth part 201 and an upper edge of a portion corresponding to the second component 3 of the fifth part 201.

In FIG. 18B, the horizontal dimension X3 between the back surface edges in the bottom surface of the fifth part 201 is shown. Since the both side surfaces of the fifth part 201 extend so as to be perpendicular to the bottom surface (extend so as to be perpendicular to a plane of paper of FIG. 18B), in the second component 3, the horizontal dimension between the back surface edges is the X3 in every distance between the side surfaces of the fifth part 201. Similarly, since the bottom surface of the fifth part 201 extends so as to be perpendicular to the both side surfaces (extends so as to be perpendicular to a plane of paper of 18C), the vertical dimension between the back surface edges is the Y3 in every distance all over the bottom surface of the fifth part 201.

Figure 19A:
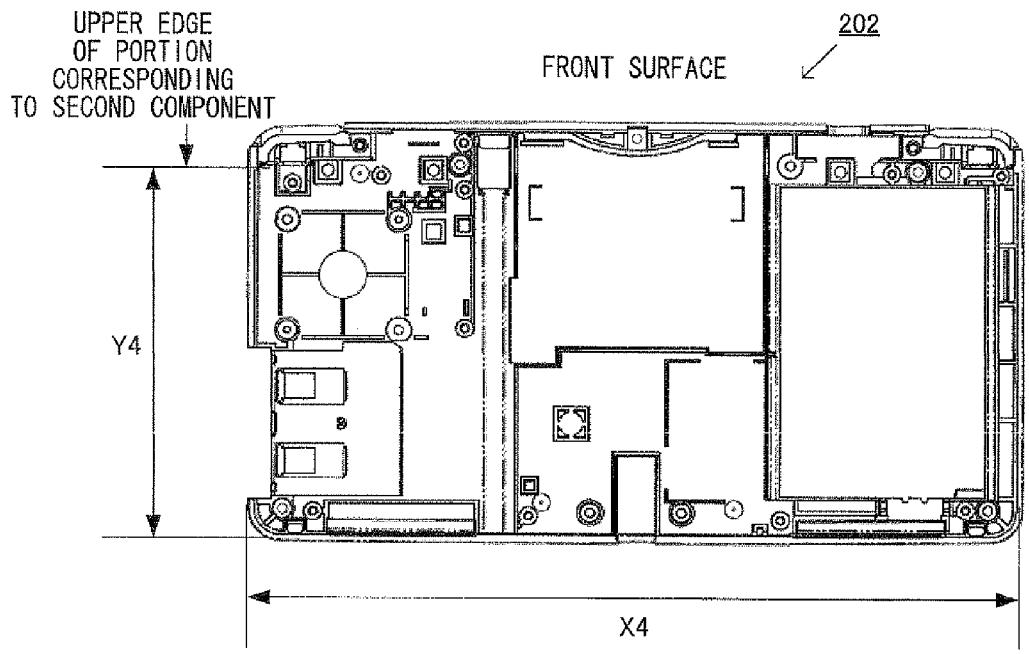
FIG. 19A is a front view of the fourth part 202, showing horizontal and vertical dimensions of the front surface side of a portion corresponding to the second component 3 of the fourth part 202.
Figure 19B:
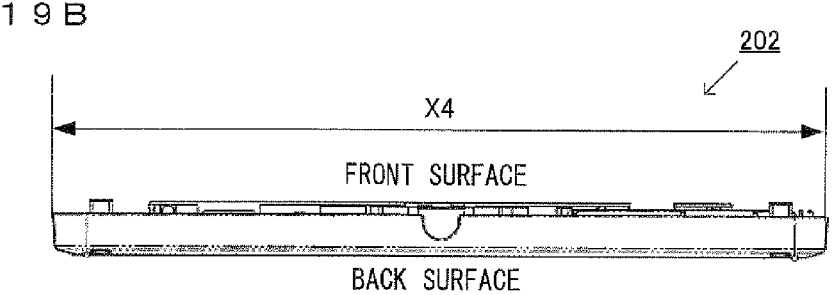
FIG. 19B is a bottom view of the fourth part 202, showing a horizontal dimension of the front surface side of the portion corresponding to the second component 3 of the fourth part 202.
Figure 19C:
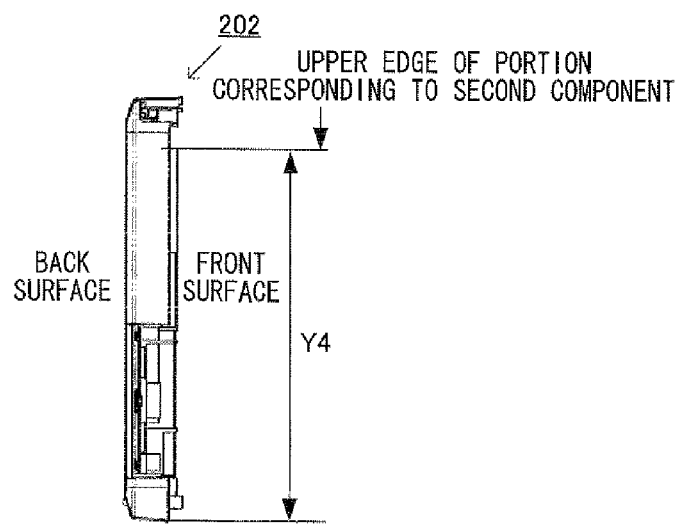
FIG. 19C is a left side view of the fourth part 202, showing a vertical dimension of the front surface side of the portion corresponding to the second component 3 of the fourth part 202.

On the other hand, dimensions of the fourth part 202 will be described. FIG. 19A is a front view of the fourth part 202, showing horizontal and vertical dimensions of the front surface side of a portion corresponding to the second component 3 of the fourth part 202. FIG. 19B is a bottom view of the fourth part 202, showing a horizontal dimension of the front surface side of the portion corresponding to the second component 3 of the fourth part 202. FIG. 19C is a left side view of the fourth part 202, showing a vertical dimension of the front surface side of the portion corresponding to the second component 3 of the fourth part 202.

As shown in FIGS. 19A, 19B, and 19C, the horizontal dimension of an outer edge of the front surface side edge portion of the portion corresponding to the second component 3 of the fourth part 202 is set to be X4 (mm). The portion corresponding to the second component 3 of the fourth part 202 is the portion corresponding to of the second component 3 of the assembled lower housing 2 and is a region below an upper edge of the portion corresponding to the second component shown in FIG. 19A and FIG. 19C. In other words, the portion corresponding to the second component 3 of the fourth part 202 is a part of the fourth part 202 and a substantially-rectangular-shaped part. In addition, the vertical dimension of an outer edge of the front surface side edge portion of the portion corresponding to the second component 3 of the fourth part 202 is set to be Y4 (mm). Here, the X4 is a distance, as viewed from the front, between a front surface side edge of the left side surface of the fourth part 202 and a front surface side edge of the right side surface of the fourth part 202. In addition, the Y4 is a distance, as viewed from the front, between a front surface edge of the bottom surface of the fourth part 202 and an upper edge of the portion corresponding to the second component 3 of the fourth part 202. In FIG. 19A and FIG. 19C, the upper edge of the portion corresponding to the second component is shown. When the fourth part 202 and the fifth part 201 are assembled, the upper edge of the portion corresponding to the second component coincides with a lower edge (the upper edge of the portion corresponding to the second component of the fifth part 201 shown in FIG. 16) of each of the protrusion parts 4a of the second connecting part 4 of the fifth part 201.

In FIG. 19B, the horizontal dimension X4 of the front surface edge of the bottom surface of the fourth part 202 is shown. Since both side surfaces of the fourth part 202 extend so as to be perpendicular to the bottom surface (extend so as to be perpendicular to a plane of paper FIG. 19B), in the second component 3, the horizontal dimension between the front surface edges is the X4 in every distance between the side surfaces of the fourth part 202. Similarly, the bottom surface of the fourth part 202 extends so as to be perpendicular to the both side surfaces (extends so as to be perpendicular to a plane of paper FIG. 19C), the vertical dimension between the front surface edges is the Y4 in every distance all over the bottom surface of the fourth part 202.

Here, the X4 is set to be larger than the X3, and the Y4 is set to be larger than the Y3. In other words, the horizontal dimension X3 between the outer edges of the back surface side edge portions of the portion corresponding to the second component 3 of the fifth part 201 is set to be smaller than the horizontal dimension X4 between the outer edges of the front surface side edge portions of the portion corresponding to the second component of the fourth part 202 all over the second component 3. In addition, the vertical dimension Y3 between the outer edges of the back surface side edge portions of the portion corresponding to of the second component 3 of the fifth part 201 is set to be smaller than the vertical dimension Y4 between the outer edges of the front surface side edge portions of the portion corresponding to the second component of the fourth part 202 all over the second component 3.

Note that X1>X3, X2>X4, Y1>Y3, and Y2>Y4 are set. Accordingly, the above-mentioned dimensions of the parts satisfy the following expressions (1) and (2).

$$X2>X4>X1>X3 \tag{1}$$

$$Y2>Y4>Y1>Y3 \tag{2}$$

Figure 20A:
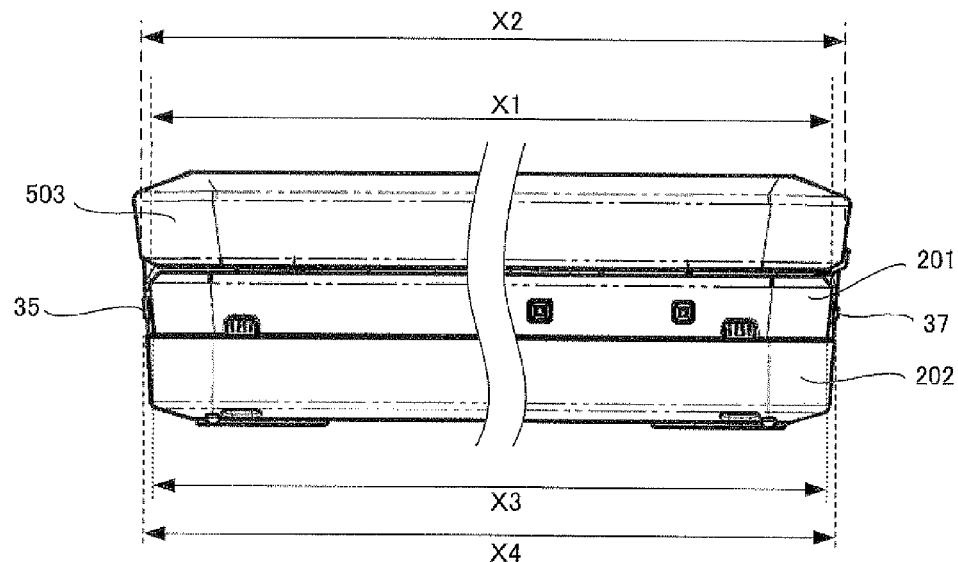
FIG. 20A shows an enlarged view of right and left edge portions of a bottom surface of the game apparatus 1 in a folded state.
Figure 20B:
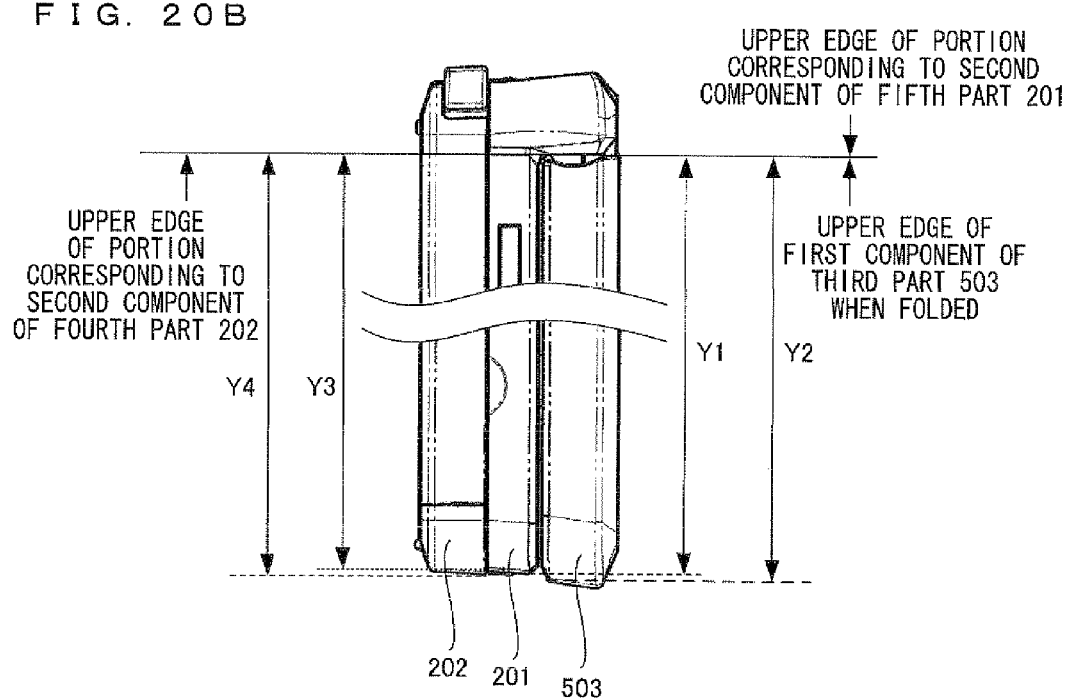
FIG. 20B shows an enlarged view of upper and lower edge portions of a left side surface of the game apparatus 1 in the folded state.

When the upper housing 5 and the lower housing 2 are configured by combining the above-described parts and the game apparatus 1 is folded, as shown in FIG. 20A and FIG. 20B, the game apparatus 1 comes to have a three-layered structure which has a shape in which a middle layer (the fifth part 201) is recessed between the other layers (a layer of the upper housing 5 and a layer of the fourth part 202). FIG. 20A is an enlarged view of right and left edge portions of a bottom surface of the game apparatus 1 in the folded state. FIG. 20B is an enlarged view of upper and lower edge portions of a left side surface of the game apparatus 1 in the folded state.

As shown in FIG. 20A, when the game apparatus 1 is folded, in the first component 6 and the second component 3, the front surface edges of the side surfaces of the fifth part 201 (edge portions where the side surfaces of the fifth part 201 and the front surface thereof intersect; upper edges of right and left both end portions of the fifth part 201 in FIG. 20A) are located inside the front surface edges of the side surfaces of the third part 503 (the back surface edges when folded (FIG. 2); lower edges of right and left both end portions of the third part 503 in FIG. 20A) (X1<X2). Here, when the upper housing 5 and the lower housing 2 are configured by assembling the parts, a center in a horizontal direction of the fifth part 201 and a center in a horizontal direction of the third part 503 coincide with each other. Since as described above, the fifth part 201 and the third part 503 are assembled such that the center in the horizontal direction of the fifth part 201 and the center in the horizontal direction of the third part 503 coincide with each other, the fifth part 201 and the third part 503 which satisfy X1<X2 are in the above-described relationship. In other words, in a state where the game apparatus is assembled, the front surface edges of the right and left side surfaces of the fifth part 201 are located inside the front surface edges of the right and left side surfaces of the third part 503 (the front surface edges in a state where the upper housing 5 is opened; and the back surface edges in a state where the upper housing 5 is folded) all over the second component.

In addition, as shown in FIG. 20B, all over the first component 6 and the second component 3, the front surface edge of the bottom surface of the fifth part 201 (the front surface side edge portion of the bottom surface of the fifth part 201; a right edge portion of the bottom surface of the fifth part 201 in FIG. 20B) is located inside the front surface edge of the top surface of the third part 503 (the front surface edge of the top surface with the upper housing 5 opened and the back surface edge of the bottom surface in (FIG. 2B) in the folded state; and the left edge of the lower edge of the third part 503 in FIG. 20B) (Y1<Y2). Here, when the upper housing 5 and the lower housing 2 are configured by assembling the parts and the upper housing 5 is folded, the upper edge of the portion corresponding to the second component of the fifth part 201 coincides with the upper edge of the portion corresponding to the first component of the third part 503 (refer to FIG. 20B). Therefore, in a state where the game apparatus is assembled as described above, all over the bottom surface, the front surface edge of the bottom surface of the fifth part 201 is located inside the back surface edge of the bottom surface of the third part 503 (the back surface edge of the bottom surface in the folded state and the front surface edge of the top surface in the opened state) when folded.

In addition, as shown in FIG. 20A, all over the second component 3, the back surface edges of the side surfaces of the fifth part 201 (the back surface side edge portions of the side surfaces of the fifth part 201; and the lower edges of the right and left both end portions of the fifth part 201 in FIG. 20A) are located inside the front surface edges of the side surfaces of the fourth part 202 (the front surface side edge portions of the side surfaces of the fourth part 202; and the upper edges of the right and left both end portions of the fourth part 202 in FIG. 20A) (X3<X4). Here, when the upper housing 5 and the lower housing 2 are configured by assembling the parts, a center of a horizontal direction of the fifth part 201 and a center of a horizontal direction of the fourth part 202 coincide with each other. As described above, since the fifth part 201 and the fourth part 202 are assembled such that the center of the horizontal direction of the fifth part 201 and the center of the horizontal direction of the fourth part 202 coincide with each other, the fifth part 201 and the fourth part 202 which satisfy X3<X4 are in the above-described relationship. In other words, the back surface edges of the right and left side surfaces of the fifth part 201 are located inside the front surface edges of the right and left side surfaces of the fourth part 202 all over the second component 3.

In addition, as shown in FIG. 20B, all over the second component 3, the back surface edge of the bottom surface of the fifth part 201 (the back surface side edge portion of the bottom surface of the fifth part 201; and a left edge portion of the bottom surface of the fifth part 201 in FIG. 20B) is located inside the front surface edge of the bottom surface of the fourth part 202 (the front surface side edge portion of the bottom surface of the fourth part 202; and a right edge portion of the bottom surface of the fourth part 202 in FIG. 20B) (Y3<Y4). Here, when the upper housing 5 and the lower housing 2 are configured by assembling the parts, an upper edge of the portion corresponding to the second component of the fifth part 201 and an upper edge of the portion corresponding to the second component of the fourth part 202 coincide with each other. Therefore, as described above, the back surface edge of the bottom surface of the fifth part 201 is located inside the front surface of the bottom surface of the fourth part 202 all over the bottom surface. Thus, when folded, the game apparatus 1 has formed therein continuous recesses in the side surfaces and the bottom surface.

When the game apparatus 1 is configured by assembling the parts formed as described above, as shown in FIG. 20A and FIG. 20B, in a state where the game apparatus 1 is folded, the recesses in the side surfaces and the bottom surface, which are continuously connected, are formed in a middle part of the game apparatus 1. In other words, as shown in FIG. 20A, when the game apparatus 1 is folded, the game apparatus 1 comes to have the three-layered structure whose middle layer is recessed. On a left side of the middle layer, the sound volume switch 35 is arranged, and on a right side of the middle layer, the wireless switch 37 is arranged (FIG. 20A).

As described above, since the switches (35 and 37) are arranged in the middle layer which become recessed when the game apparatus 1 is folded, erroneous operations of the switches, caused while the game apparatus 1 is not in use, can be prevented. In other words, while the game apparatus 1 is not in use, the game apparatus 1 is in the folded state and the middle layer of the game apparatus 1 becomes recessed in such a state. Therefore, a degree to which key tops of the switches (35 and 37) protrude in side surface directions and a bottom surface direction become small, as compared with a case where the game apparatus 1 has a two-layered structure (in other words, a case where the middle layer is not recessed). In a case where a game apparatus whose lower housing 2 is formed so as to be one layer is folded, since the key tops of the switches (35 and 37) protrude in the side surface directions, a finger(s) of a user or other object may contact the switches while the game apparatus 1 is being carried, whereby erroneous operations may be easily caused. However, the middle layer which becomes recessed when the game apparatus 1 is folded is formed and the switches are arranged as described above, the degree to which the key tops of the switches protrude in the side surface directions become small, and thus, the erroneous operations caused when the game apparatus 1 is folded can be prevented.

In addition, since the game apparatus 1 has the three-layered structure whose middle layer is recessed when closed, it is easy to open and close the game apparatus 1. In other words, since the game apparatus 1 has the recessed portion formed in the middle part of the three-layered structure, a finger(s) of a user can be easily caught in the recess and the upper housing 5 can be easily lifted up.

In addition, since the game apparatus 1 has the three-layered structure whose middle layer is recessed, it is easy to open and close the cover 36a covering the SD card insertion slot of the SD card unit 36. The SD card insertion slot of the SD card unit 36 is provided in the left side surface of the fourth part 202 such that the front surface side thereof is open (refer to FIG. 10A). The SD card insertion slot is covered by the cover 36a. Since a back surface side of the middle layer (fifth part 201) is more recessed than a front surface side of a lower layer (fourth part 202), a front surface side edge portion of the cover 36a is slightly exposed in a boundary between the lower layer and the middle layer. Accordingly, it is easy for a user to pick up the front surface side edge portion of the cover 36a with his or her finger and to open and close the cover 36a. Furthermore, since in the left side surface of the fifth part 201, in a portion corresponding to the SD card insertion slot provided in the fourth part 202, the recess 201K is formed (refer to FIG. 9A), the cover 36a can be more easily opened and closed.

Figure 21:
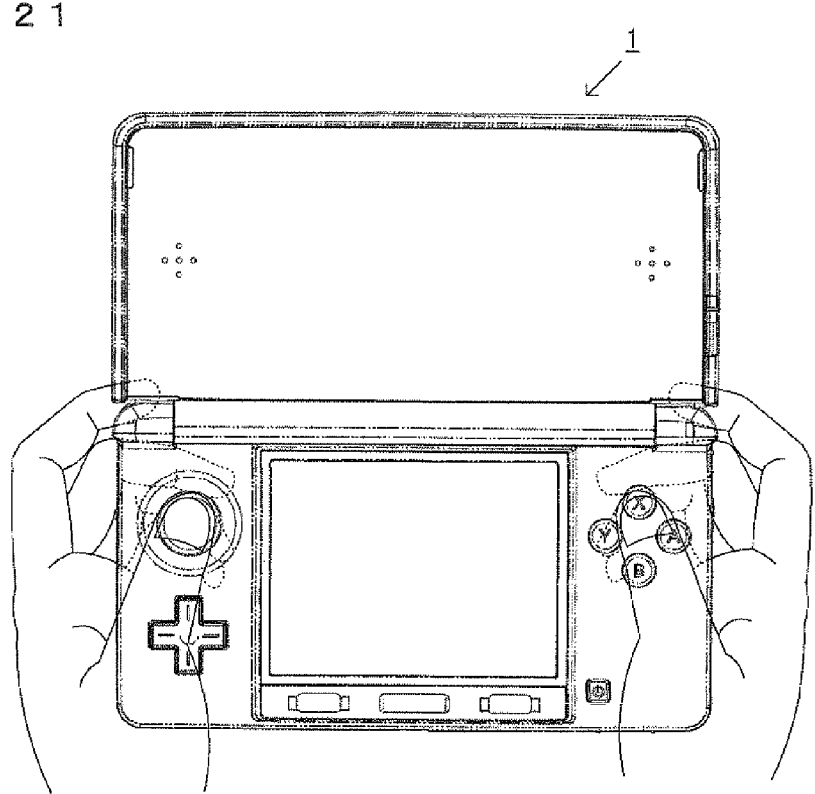
FIG. 21 is a diagram illustrating a view in which a user holds the game apparatus 1 and operates the game apparatus 1.

In addition, when the game apparatus 1 is used, a user opens the game apparatus 1, holds the lower housing 2 with his or her both hands, and looks straight at the upper side LCD 51. FIG. 21 is a diagram illustrating a view in which a user holds the game apparatus 1 and operates the game apparatus 1. Since the switches (35 and 37) are arranged in the middle layer (fifth part 201) of the right and left side surfaces of the lower housing 2, when a user holds the lower housing 2, it is easy for a user to perform operations with his or her index finger, middle finger, or the like. In other words, the fifth part 201 (middle layer) of the lower housing 2, in which the switches (35 and 37) are arranged, is more recessed inward than the fourth part 202. Therefore, a user can slide his or her finger(s) in up-and-down directions along this recess (the recess formed by the front surface edges of the side surfaces of the fourth part 202 and the side surfaces of the fifth part 201). Accordingly, while looking straight at the upper side LCD 51 (without visually checking the switches), a user can check the positions of the switches (35 and 37) and operate the switches (35 and 37).

Figure 22A:
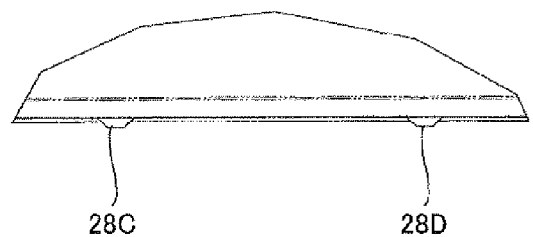
FIG. 22A is a diagram illustrating an enlarged view of portions in which the power LED 28C and the charge LED 28D are arranged, as viewed from the front in the state where the game apparatus 1 is opened.
Figure 22B:
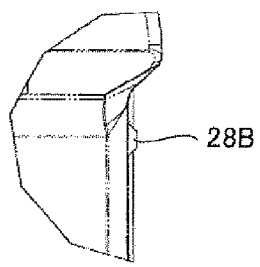
FIG. 22B is a diagram illustrating an enlarged view of a portion in which the wireless LED 28B is arranged, as viewed from the front in the state where the game apparatus 1 is opened.

In addition, the LEDs 28B, 28C, and 28D are arranged in the side surface and the bottom surface of the fifth part 201 (middle layer). The LEDs 28B, 28C, and 28D are provided in the side surface and the bottom surface thereof, whereby the LEDs 28B, 28C, and 28D are visible when the game apparatus 1 is both opened and closed. However, when LEDs are provided in the side surface and the bottom surface, visibility of these LEDs from the front is poor. Therefore, the LED lenses are protruded by utilizing the recesses, whereby it is made possible to visually check a lighting state of each of the LEDs also from the front. In addition, the wireless switch 37 and the LED 28B indicating a functioning state of the wireless switch 37 can be provided in the same plane so as to be adjacent to each other, thereby allowing intuitive grasping. In a state where the game apparatus 1 is used (state where the game apparatus 1 is opened), the LED lenses of the LEDs 28B, 28C, and 28D are slightly protruded in a side surface direction and a bottom surface direction. FIG. 22A is a diagram illustrating an enlarged view of portions in which the power LED 28C and the charge LED 28D are arranged, as viewed from the front in the state where the game apparatus 1 is opened. FIG. 22B is a diagram illustrating an enlarged view of a portion in which the wireless LED 28B is arranged, as viewed from the front in the state where the game apparatus 1 is opened. As shown in FIGS. 22A and 22B, the LEDs 28B, 28C, and 28D are slightly protruded in the bottom surface direction and the side surface (right side surface) direction, as viewed from the front in the state where the game apparatus 1 is opened. Therefore, when the game apparatus 1 is viewed from the front, since a user can visually check the LEDs 28B, 28C, and 28D, a user can confirm a state of the game apparatus 1 (whether the power is turned on or off, whether or not the wireless communication is established, and the like). In addition, because these are provided in the recessed middle layer, even when the LED lenses are protruded, a degree to which the LED lenses are protruded from the side surface of the apparatus when the apparatus is folded can be eliminated or made small.

In addition, since the game apparatus 1 has the above-described three-layered structure, by varying colors, designs, and the like of the respective layers, it is made possible for the game apparatus 1 to have a lot of design variations (colors, designs, textures, etc.). For example, the upper layer (upper housing 5), the middle layer (fifth part 201), the lower layer (fourth part 202 and the sixth part 203) are designed so as to have the same type of color and to change color strengths. In addition, for example, the three layers can be designed so as to have colors which are different from one another. Furthermore, by coloring the sixth part 203 with a different color, color variations can be increased.

In addition, the inner surface of the upper housing 5 of the game apparatus 1 is covered by the second part 502 which is a flat plate having the transparent region. Therefore, the screws with which the first part 501 and the third part 503 are fastened are not exposed above the inner surface. In addition, the whole surface of the inner surface of the upper housing 5 is covered by the second part 502, whereby the inner surface and the upper side LCD 51 arranged in the inner surface can be caused to have a feeling of oneness and a feeling of unity. Thus, a user's attention can be brought to the upper side LCD 51. In other word, since the inner surface of the upper housing 5 has no irregularities and is formed to be flat, when a user looks straight at the inner surface of the upper housing 5, a user can more easily pay attention to the upper side LCD 51. When a user look at a three-dimensional image displayed on the upper side LCD 51, it is necessary to focus a user's eyes frontward from the screen or toward a depth direction of the screen. In this case, if the inner surface of the upper housing 5 has irregularities, there may be a case where it is difficult to focus a user's eyes. However, since the inner surface of the upper housing 5 is covered by the second part 502, it is easier for a user to look at the upper side LCD 51.

In addition, the second part 502 has the region, which is other than the regions corresponding to the upper side LCD 51 and the inside image pickup part 52 and is subjected to printing from the back surface, and is bonded to the first part 501 (FIG. 13G). In addition, on the second part 502, the characters inscribed so as to appear transparent are printed on the region thereof which covers the LED and corresponds to the LED. As described above, the first part 501 and the second part 502 are separated, whereby printing processes conducted when the upper housing 5 is subjected to the printing can be made efficient. For example, when the printing is conducted directly onto the first part 501, and the inner surface of the upper housing 5 is thereby configured, the housing member which is formed by a mold is first subjected to painting. It is necessary for the painted housing member to be dried for a predetermined period of time. The dried housing member is subjected to pad printing. After the pad printing, the housing member is subjected to coating or the like for surface protection. These processes are independent processes and are conducted by using apparatuses which are different from one another. In addition, in the pad printing, it is necessary to accurately fix a position of the housing member, and if the position is not accurately fixed, the printing may be deviated. On the other hand, as in the present embodiment, in a case where the second part 502 is subjected to the printing and is bonded to the first part 501, the above-mentioned printing processes can be made efficient. In other words, the first part 501 and the second part 502 are formed in the separate processes, and while the first part 501 is being subjected to the painting and the drying, the second part 502 can be subjected to the printing. For the second part 502, the flat-plate-like transparent resin subjected to hard coating can be instantaneously subjected to the printing through the screen printing. Thus, in a case where the configuration is made by the two parts, the processes can be conducted in parallel, and time periods required for the printing processes are different from each other. As described above, the first part 501 and the second part 502 are separated, whereby the printing processes conducted when the upper housing 5 is subjected to the printing can be made efficient. In addition, the second part 502 which is the transparent member is subjected to the printing, and in the back surface thereof, the LED is arranged, whereby a variety of printing of characters inscribed so as to appear transparent and the like can be conducted and these characters and the like can be made luminous by the LED.

In addition, since the second part 502 covers the whole surface of the upper housing 5, the second part 502 can also serve as a lens cover for the inside image pickup part 52.

In addition, since the substantially whole surface of the back surface of the lower housing 2 is covered by the sixth part 203, the screws fastening the fourth part 202 and the fifth part 201 can be concealed. Since the screws are concealed by the sixth part 203, with no limitations in terms of an external view imposed, the number and the arrangement of the parts housed inside the lower housing 2 can be designed, and a degree of freedom with which screws required in terms of a strength are arranged can be increased. In addition, since the sixth part 203 constitutes the back surface of the lower housing 2, by changing the color, the design, and the like of the sixth part 203, the design variations can be imparted. For example, if the sixth part 203 covers only one part of the back surface of the lower housing 2 (for example, one part where the battery 41 is arranged) and the back surface of the fourth part 202 or other member constitutes the other part, the back surface of the lower housing 2 comes to be formed by a plurality of regions. Therefore, in a case where a pattern is drawn on the whole back surface of the lower housing 2, boundaries of the regions are made discontinuous, which is not favorable in terms of an external view, and it is made difficult to draw a complicated pattern on the back surface. However, since the whole surface of the back surface of the lower housing 2 is covered by the sixth part 203, a complicated pattern or the like can be drawn.

In addition, in the inner surface of the lower housing 2, the sheet keys 27A, 27B, and 27C are arranged. The game apparatus 1 has a multitude of the buttons or the like (23, 24, and 25) for operations and the sheet keys 27A, 27B, and 27C are used for uses which are different from those of these buttons or the like (23, 24, and 25) for operations. In other words, whereas the buttons or the like (23, 24, and 25) for operations are mainly used for the operations of characters and the like which appear in a game, the sheet keys 27A, 27B, and 27C are mainly used for special purposes such as switching of the screens and starting and suspending of a game. Thus, since the different kinds of the sheet keys constitute the keys (27A, 27B, and 27C) whose uses are different from one another, a confusion of a user caused in a case where the game apparatus 1 has a multitude of operation buttons can be prevented and erroneous operations can be thereby prevented. In other words, if the game apparatus 1 has a multitude of switches, buttons, and the like, when a user performs some operation, there may be a case where it is difficult for a user to find which switch or button should be pressed and therefore, a confusion may be easily caused. However, as in a case of the game apparatus 1, the sheet keys constitute the keys whose uses are different from one another, thereby preventing the above-mentioned confusion and erroneous operations.

(Internal Configuration of Game Apparatus 1)

Next, with reference to FIG. 23, an internal electrical configuration of the game apparatus 1 will be described. FIG. 23 is a block diagram illustrating the internal configuration of the game apparatus 1. As shown in FIG. 23, in addition to the above-described parts, the game apparatus 1 includes electronic components such as an information processing part 42, a main memory 43, an internal memory 44 for storing data, a real-time clock (RTC) 45, an acceleration sensor 46, a gyro sensor 49, and a power circuit 48. These electronic components are implemented on an electronic circuit board and housed inside the lower housing 2.

The information processing part 42 is information processing means which includes a CPU (Central Processing Unit) 421 for executing a predetermined program, a GPU (Graphics Processing Unit) 422 for performing image processing, and the like. In the present embodiment, the predetermined programs are stored in memories in the game apparatus 1 (for example, the game card 70 connected to the game card unit 32 and the internal memory 44 for storing data). By executing the predetermined program, the CPU 421 of the information processing part 42 shoots an image by using the above-mentioned outside image pickup part 56 and inside image pickup part 52 and performs a predetermined game. The program executed by the CPU 421 of the information processing part 42 may be obtained from other apparatus through communication with other apparatus. In addition, the information processing part 42 includes a VRAM (Video RAM) 423. The GPU 422 of the information processing part 42 generates an image in accordance with an instruction from the CPU 421 of the information processing part 42 and writes it in the VRAM 423. The GPU 422 of the information processing part 42 outputs the image written in the VRAM 423 to the upper side LCD 51 and/or the lower side LCD 21, and the image is displayed on the upper side LCD 51 and/or the lower side LCD 21.

Connected to the information processing part 42 are the main memory 43, the game card unit 32, the SD card unit 36, the internal memory 44 for storing data, the wireless communication module 39, the infrared-ray communication module 30, the RTC 45, the acceleration sensor 46, the LEDs 28A, 28B, 28C, and 28D, the 3D LED 53, the cross key 23, the buttons (the operation button unit 24, the buttons 27A, 27B, and 27C, and the buttons 29A, 29B, and 29C), the analog key 25, the lower side LCD 21, the upper side LCD 51, the outside image pickup part 56, the inside image pickup part 52, the switches (the sound volume switch 35, the wireless switch 37, and the parallax amount adjustment switch 55), the interface (IN) circuit 47, and the like.

The main memory 43 is volatile storage means used as a work region and a buffer region for (the CPU 421 of) the information processing part 42. In other words, the main memory 43 temporarily stores various kinds of data used while the above-mentioned predetermined program is being executed and temporarily stores a program obtained externally (from the game card 70 or from other apparatus or the like). In the present embodiment, as the main memory 43, for example, a PSRAM (Pseudo-SRAM) is used.

The game card 70 is nonvolatile storage means for storing the program executed by the information processing part 42. For example, a read-only semiconductor memory constitutes the game card 70. Upon connecting the game card 70 to the game card unit 32, the information processing part 42 can load the program stored in the game card 70. By executing the program loaded by the information processing part 42, predetermined processing is performed. A nonvolatile random access memory (for example, a NAND-type flash memory) constitutes the SD card 71, and the SD card 71 is used for storing predetermined data. For example, stored in the SD card 71 are an image shot by the outside image pickup part 56 and an image shot by other apparatus. Upon connecting the SD card 71 to the SD card unit 36, the information processing part 42 reads an image stored in the SD card 71, and the image can be displayed on the upper side LCD 51 and/or the lower side LCD 21.

A nonvolatile random access memory (for example, a NAND-type flash memory) constitutes the internal memory 44 for storing data, and the internal memory 44 for storing data is used for storing predetermined data. For example, stored in the internal memory 44 for storing data are data and a program which are downloaded through wireless communication via the wireless communication module 39.

In addition, connected to the information processing part 42 is the acceleration sensor 46. The acceleration sensor 46 detects magnitudes of accelerations (linear accelerations) in straight-line directions along three-axis (an x-axis, a y-axis, and a z-axis) directions. The acceleration sensor 46 is provided inside the lower housing 2. With the game apparatus 1 being set in the open state and viewed from the front (FIG. 1), the acceleration sensor 46 detects the magnitudes of the linear accelerations of the x axis which is a long-side direction of the lower housing 2, the y axis which is a short-side direction of the lower housing 2, and the z axis which is a direction perpendicular to the inner surface (front surface) of the lower housing 2. Although as the acceleration sensor 46, for example, a capacitance type acceleration sensor is used, other type acceleration sensor may be used. In addition, the acceleration sensor 46 may be an acceleration sensor which detects one axis or two axes. The information processing part 42 receives data (acceleration data) indicating the accelerations detected by the acceleration sensor 46 and can detect a posture and a motion of the game apparatus 1.

In addition, connected to the information processing part 42 is the gyro sensor 49. The gyro sensor 49 detects magnitudes of angular velocities in three-axis directions. The gyro sensor 49 detects the angular velocities, and the information processing part 42 can thereby detect a posture and a motion of the game apparatus 1. In other words, by integrating the angular velocities detected by the gyro sensor 49 with respect to time, the information processing part 42 can detect rotation angles of the axes. When the game apparatus 1 is in a predetermined posture, it is necessary to initialize the gyro sensor 49. By detecting a change occurring from the predetermined posture based on the angular velocities detected by the gyro sensor 49, the information processing part 42 can detect a posture in a space of the game apparatus 1.

The RTC 45 counts a time and outputs it to the information processing part 42. Based on the time counted by the RTC 45, the information processing part 42 calculates a current time (date). The power circuit 48 controls electric power supplied from the power source (battery 41), which the game apparatus 1 has, and supplies the electric power to each of the parts of the game apparatus 1.

In addition, connected to the information processing part 42 is the I/F circuit 47. Connected to the I/F circuit 47 are the touch panel 22, the microphone 40, and the loudspeakers 54. Specifically, the loudspeakers 54 are connected to the I/F circuit 47 via an amplifier not shown. The microphone 40 detects a voice of a user and outputs an audio signal to the I/F circuit 47. The amplifier amplifies the audio signal from the I/F circuit 47, and the voice is outputted from the loudspeakers 54.

In addition, the cross key 23, the analog key 25, the buttons (24, 27, and 29), and the switches (35, 37, and 55) are connected to the information processing part 42. The information processing part 42 detects that these operation means (the keys, the buttons, the switches, etc.) are operated and performs predetermined processes in accordance with the operated operation means.

The lower side LCD 21 and the upper side LCD 51 are connected to the information processing part 42. The lower side LCD 21 and the upper side LCD 51 display images in accordance with instructions issued from (the GPU 422 of) the information processing part 42. For example, the information processing part 42 causes the upper side LCD 51 to display a three-dimensional image (stereoscopically viewable image) using an image for a right eye and an image for a left eye, which are shot by the outside image pickup part 56, and a two-dimensional image shot by the inside image pickup part 52.

Specifically, the information processing part 42 is connected to an LCD controller (not shown) of the upper side LCD 51 and causes the LCD controller to control turning on/off of the parallax barrier. When the parallax barrier of the upper side LCD 51 is on, an image for a right eye and an image for a left eye, which have been stored in the VRAM 423 of the information processing part 42 (shot by the outside image pickup part 56), are outputted to the upper side LCD 51. More specifically, by alternately repeating a process of reading out pixel data per line in a vertical direction with respect to the image for a right eye and a process of reading out pixel data per line in a vertical direction with respect to the image for a left eye, the LCD controller reads out the image for a right eye and the image for a left eye from the VRAM 423. Thus, the image for a right eye and the image for a left eye are divided into strip-like images whose pixels vertically line up, each of the pixels being one line, and an image in which each of the strip-like images of the divided image for a right eye and each of the strip-like images of the divided image for a left eye are alternately arranged is displayed on the screen of the upper side LCD 51. The image is visually recognized by a user via the parallax barrier of the upper side LCD 51, whereby a user's right eye visually recognizes the image for a right eye and a user's left eye visually recognizes the image for a left eye. As described above, on the screen of the upper side LCD 51, the stereoscopically viewable image is displayed.

The outside image pickup part 56 and the inside image pickup part 52 are connected to the information processing part 42. In accordance with instructions from the information processing part 42, the outside image pickup part 56 and the inside image pickup part 52 shoot images and output data of the shot images to the information processing part 42.

In addition, the 3D LED 53 is connected to the information processing part 42. The information processing part 42 controls lighting of the 3D LED 53. As above, the internal configuration of the game apparatus 1 is described.

While the invention has been described in detail, the foregoing description is in all aspects illustrative and not restrictive. It will be understood that numerous other modifications and variations can be devised without departing from the scope of the invention.

What is claimed is:

1. A group of parts constituting an upper housing and a lower housing of a hand-held game apparatus, the hand-held game apparatus comprising: the upper housing including a first component being substantially-rectangular-shaped and a first connecting part protruding from a central portion of a bottom surface of the first component; and the lower housing including a second component being substantially-rectangular-shaped and being a portion on top of which the first component of the upper housing lies when the hand-held game apparatus is folded and a second connecting part being a portion above the second component and having protrusion parts at both ends, the lower housing foldably connected to the upper housing by connecting the second connecting part to the first connecting part, wherein housed inside the upper housing are:
a first LCD being a naked-eye stereoscopic view display system;
an image pickup unit integrally assembled, including a first image pickup device and second and third image pickup devices for stereo shooting such that an imaging direction of the first image pickup device is opposite to an imaging direction of each of the second and third image pickup devices for stereo shooting;
right and left loudspeakers; and
a first LED for indicating a display state of a stereoscopic view of the first LCD,
housed inside the lower housing are:
a second LCD being a planar view display system, having a display area smaller than a display area of the first LCD, and having mounted thereon a touch panel;
an analog key and a cross key;
a first switch, a second switch, a third switch, and a fourth switch arranged in a cross-like manner;
a fifth switch, a sixth switch, and a seventh switch arranged in a linear manner;
a eighth switch, a ninth switch, a second LED, a third LED, and a battery; and
a memory card readout unit for having attached therein a detachable memory card and for reading out data of the memory card, and
the group of parts including:
a first part having formed therein a third component having a substantially same shape and a substantially same size as a shape and as a size of a front surface of the first component of the upper housing and arranged inside the upper housing and having formed therein a front surface side part of the first connecting part of the upper housing;
a second part being flat-plate-like and having a substantially same shape and a substantially same size as the shape and as the size of the front surface of the first component of the upper housing;
a third part including surfaces constituting a back surface, both side surfaces and a top surface of the upper housing and including a back surface side portion of the first connecting part;
a fourth part including surfaces constituting back surface side portions of both side surfaces, a back surface side portion of the top surface, and a back surface side portion of the bottom surface of the lower housing;
a fifth part including surfaces constituting a front surface, front surface side portions of the both side surfaces, a front surface side portion of the top surface, and a front surface side portion of the bottom surface of the lower housing and including the protrusion parts of the second connecting part of the lower housing; and
a sixth part being flat-plate-like and constituting the back surface of the lower housing,
the first part including in the third component:
a first LCD opening for exposing a display part of the first LCD in a front surface direction; a front surface image pickup device opening for exposing the first image pickup device of the image pickup unit in the front surface direction; loudspeaker openings for exposing the loudspeakers in the front surface direction; a first LED opening for exposing the first LED in the front surface direction; and screw holes,
the second part
being a resin member whose at least regions corresponding to the first LCD opening and the front surface image pickup device opening are transparent and whose at least region corresponding to the first LED opening has been subjected to printing which causes inscription to appear transparent; and
including, in regions corresponding to the loudspeaker openings, holes,
the third part including:
surfaces constituting the back surface, the both side surfaces and the top surface of the upper housing; and a recess, for housing the third component of the first part and the second part with the one on top of the other, formed by the both side surfaces, the top surface, and the bottom surface thereof,
the fourth part
including on a back surface side a recess having a size, as viewed from the front, larger than 70% of a size of the back surface of the lower housing, as viewed from the front;
including in the recess: a battery housing part for housing the battery so as to allow the battery to be taken out from a back surface direction; first screw holes, the number of which is n; second screw holes, the number of which is m (m is smaller than n); and hook slots; and
including in a side surface thereof an opening for inserting the detachable memory card into the memory card readout unit housed in the lower housing, the opening covered by a lid member which is opened and closed in the back surface direction, the opening formed such that a front surface side thereof is open,
the fifth part including in the front surface:
a second LCD opening, for exposing the second LCD in the front surface direction, having an opening area smaller than an opening area of the first LCD opening;
an analog key opening for exposing an operation part of the analog key in the front surface direction;
a cross key opening for exposing an operation part of the cross key in the front surface direction;

a first switch opening, a second switch opening, a third switch opening, and a fourth switch opening, for exposing operation parts of the first switch, the second switch, the third switch, and the fourth switch in the front surface direction, arranged in a cross-like manner;

a fifth switch opening, a sixth switch opening, and a seventh switch opening, for exposing operation parts of the fifth switch, the sixth switch, and the seventh switch in the front surface direction, arranged in a linear manner; and a sheet key top mounting part, for mounting a sheet key top covering upper portions of the fifth switch opening, the sixth switch opening, and the seventh switch opening, including thereinside the fifth switch opening, the sixth switch opening, and the seventh switch opening, the sheet key top being integrally formed and horizontally long, the second LCD opening and the sheet key top mounting part arranged such that in a rectangular region arranged in a substantially central portion of the front surface of the fifth part, the second LCD opening is placed in an upper region of the rectangular region and the sheet key top mounting part is placed in an lower region of the rectangular region in a manner adjacent to each other, the fifth part including in one of the side surfaces:

an eighth switch opening for exposing an operation part of the eighth switch in a side surface direction; and a second LED opening for guiding emitted light of the second LED and for arranging a lens member so as to protrude from the opening, the fifth part including in the other of the side surfaces:

a ninth switch opening for protruding an operation part of the ninth switch in a side surface direction, the fifth part including in the bottom surface a third LED opening for guiding emitted light of the third LED and for arranging a lens member so as to protrude from the opening, the fifth part including screw holes, the number of which is n, corresponding to the first screw holes, the sixth part being a flat plate having a size corresponding to a size of the recess of the fourth part, and including screw holes, the number of which is m, corresponding to the second screw holes of the fourth part, horizontal and vertical dimensions of front surface edges of a portion corresponding to the second component of the fifth part being made smaller than horizontal and vertical dimensions of front surface edges of a portion corresponding to the first component of the third part, and horizontal and vertical dimensions of back surface edges of the portion corresponding to the second component of the fifth part being made smaller than horizontal and vertical dimensions of front surface edges of a portion corresponding to the second component of the fourth part, when the hand-held game apparatus is folded, front surface edges of side surfaces of the fifth part being located inside front surface edges of side surfaces of the third part, front surface edges of a bottom surface of the fifth part being located inside front surface edges of a top surface of the third part, further, back surface edges of side surfaces of the fifth part being located inside front surface edges of side surfaces of the fourth part, and further, back surface edges of the bottom surface of the fifth part being located inside front surface edges of a bottom surface of the fourth part, thereby forming recesses in middle portions of side surfaces and a bottom surface of the hand-held game apparatus when folded.

2. The first part, according to claim 1, constituting the upper housing among the group of parts constituting the upper housing and the lower housing.

3. The second part, according to claim 1, constituting the upper housing among the group of parts constituting the upper housing and the lower housing.

4. The third part, according to claim 1, constituting the upper housing among the group of parts constituting the upper housing and the lower housing.

5. The fourth part, according to claim 1, constituting the lower housing among the group of parts constituting the upper housing and the lower housing.

6. The fifth part, according to claim 1, constituting the lower housing among the group of parts constituting the upper housing and the lower housing.

7. The sixth part, according to claim 1, constituting the lower housing among the group of parts constituting the upper housing and the lower housing.

8. A hand-held game apparatus comprising: an upper housing including a first component being substantially-rectangular-shaped and a first connecting part protruding from a central portion of a bottom surface of the first component; and a lower housing including a second component being substantially-rectangular-shaped and being a portion on top of which the first component of the upper housing lies when the hand-held game apparatus is folded and a second connecting part being a portion above the second component and having protrusion parts at both ends, the lower housing foldably connected to the upper housing by connecting the second connecting part to the first connecting part, wherein housed inside the upper housing are:
a first LCD being a naked-eye stereoscopic view display system;
an image pickup unit integrally assembled, including a first image pickup device and second and third image pickup devices for stereo shooting such that an imaging direction of the first image pickup device is opposite to an imaging direction of each of the second and third image pickup devices for stereo shooting;
right and left loudspeakers; and
a first LED for indicating a display state of a stereoscopic view of the first LCD, and housed inside the lower housing are:
a second LCD being a planar view display system, having a display area smaller than a display area of the first LCD, and having mounted thereon a touch panel;
an analog key and a cross key;
a first switch, a second switch, a third switch, and a fourth switch arranged in a cross-like manner;
a fifth switch, a sixth switch, and a seventh switch arranged in a linear manner;
a eighth switch, a ninth switch, a second LED, a third LED, and a battery; and
a memory card readout unit for having attached therein a detachable memory card and for reading out data of the memory card, the upper housing and the lower housing of the hand-held game apparatus including:
a first part having formed therein a third component having a substantially same shape and a substantially same size as a shape and as a size of a front surface of the first component of the upper housing and arranged inside the upper housing and having formed therein a front surface side part of the first connecting part of the upper housing;

a second part being flat-plate-like and having a substantially same shape and a substantially same size as the shape and as the size of the front surface of the first component of the upper housing;

a third part including surfaces constituting a back surface, both side surfaces and a top surface of the upper housing and including a back surface side portion of the first connecting part;

a fourth part including surfaces constituting back surface side portions of both side surfaces, a back surface side portion of the top surface, and a back surface side portion of the bottom surface of the lower housing;

a fifth part including surfaces constituting a front surface, front surface side portions of the both side surfaces, a front surface side portion of the top surface, and a front surface side portion of the bottom surface of the lower housing and including the protrusion parts of the second connecting part of the lower housing; and a sixth part being flat-plate-like and constituting the back surface of the lower housing, the first part including in the third component:

a first LCD opening for exposing a display part of the first LCD in a front surface direction; a front surface image pickup device opening for exposing the first image pickup device of the image pickup unit in the front surface direction; loudspeaker openings for exposing the loudspeakers in the front surface direction; a first LED opening for exposing the first LED in the front surface direction; and screw holes, the second part being a resin member whose at least regions corresponding to the first LCD opening and the front surface image pickup device opening are transparent and whose at least region corresponding to the first LED opening has been subjected to printing which causes inscription to appear transparent; and including, in regions corresponding to the loudspeaker openings, holes, the third part including:

surfaces constituting the back surface, the both side surfaces and the top surface of the upper housing; and a recess, for housing the third component of the first part and the second part with the one on top of the other, formed by the both side surfaces, the top surface, and the bottom surface thereof, the fourth part including on a back surface side a recess having a size, as viewed from the front, larger than 70% of a size of the back surface of the lower housing, as viewed from the front;

including in the recess: a battery housing part for housing the battery so as to allow the battery to be taken out from a back surface direction; first screw holes, the number of which is n; second screw holes, the number of which is m (m is smaller than n); and hook slots; and including in a side surface thereof an opening for inserting the detachable memory card into the memory card readout unit housed in the lower housing, the opening covered by a lid member which is opened and closed in the back surface direction, the opening formed such that a front surface side thereof is open, the fifth part including in the front surface:

a second LCD opening, for exposing the second LCD in the front surface direction, having an opening area smaller than an opening area of the first LCD opening;

an analog key opening for exposing an operation part of the analog key in the front surface direction;

a cross key opening for exposing an operation part of the cross key in the front surface direction;

a first switch opening, a second switch opening, a third switch opening, and a fourth switch opening, for exposing operation parts of the first switch, the second switch, the third switch, and the fourth switch in the front surface direction, arranged in a cross-like manner;

a fifth switch opening, a sixth switch opening, and a seventh switch opening, for exposing operation parts of the fifth switch, the sixth switch, and the seventh switch in the front surface direction, arranged in a linear manner; and a sheet key top mounting part, for mounting a sheet key top covering upper portions of the fifth switch opening, the sixth switch opening, and the seventh switch opening, including thereinside the fifth switch opening, the sixth switch opening, and the seventh switch opening, the sheet key top being integrally formed and horizontally long, the second LCD opening and the sheet key top mounting part arranged such that in a rectangular region arranged in a substantially central portion of the front surface of the fifth part, the second LCD opening is placed in an upper region of the rectangular region and the sheet key top mounting part is placed in an lower region of the rectangular region in a manner adjacent to each other, the fifth part including in one of the side surfaces:

an eighth switch opening for exposing an operation part of the eighth switch in a side surface direction; and a second LED opening for guiding emitted light of the second LED and for arranging a lens member so as to protrude from the opening, the fifth part including in the other of the side surfaces:

a ninth switch opening for protruding an operation part of the ninth switch in a side surface direction, the fifth part including in the bottom surface a third LED opening for guiding emitted light of the third LED and for arranging a lens member so as to protrude from the opening, the fifth part including screw holes, the number of which is n, corresponding to the first screw holes, the sixth part being a fiat plate having a size corresponding to a size of the recess of the fourth part, and including screw holes, the number of which is in, corresponding to the second screw holes of the fourth part, horizontal and vertical dimensions of front surface edges of a portion corresponding to the second component of the fifth part being made smaller than horizontal and vertical dimensions of front surface edges of a portion corresponding to the first component of the third part, and horizontal and vertical dimensions of back surface edges of the portion corresponding to the second component of the fifth part being made smaller than horizontal and vertical dimensions of front surface edges of a portion corresponding to the second component of the fourth part, when the hand-held game apparatus is folded, front surface edges of side surfaces of the fifth part being located inside front surface edges of side surfaces of the third part, front surface edges of a bottom surface of the fifth part being located inside front surface edges of a top surface of the third part, further, back surface edges of side surfaces of the fifth part being located inside front surface edges of side surfaces of the fourth part, and further, back surface edges of the bottom surface of the fifth part being located inside front surface edges of a bottom surface of the fourth part, thereby forming recesses in middle portions of side surfaces and a bottom surface of the hand-held game apparatus when folded.

\* \* \* \* \*